US012739799B2

(12) United States Patent
Cozzo et al.

(10) Patent No.: US 12,739,799 B2
(45) Date of Patent: Sep. 15, 2026

(54) TRANSMISSION OF UPLINK CHANNELS WITH FREQUENCY HOPPING

(71) Applicant: Samsung Electronics Co., Ltd., Suwon-si (KR)

(72) Inventors: Carmela Cozzo, San Diego, CA (US); Aristides Papasakellariou, Houston, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 1043 days.

(21) Appl. No.: 17/658,786

(22) Filed: Apr. 11, 2022

(65) Prior Publication Data

US 2022/0353862 A1 Nov. 3, 2022

Related U.S. Application Data

(60) Provisional application No. 63/301,871, filed on Jan. 21, 2022, provisional application No. 63/281,040, filed on Nov. 18, 2021, provisional application No. 63/254,394, filed on Oct. 11, 2021, provisional application No. 63/181,066, filed on Apr. 28, 2021.

(51) Int. Cl.
*H04W 72/0446* (2023.01)
*H04B 1/713* (2011.01)

(52) U.S. Cl.
CPC ........ *H04W 72/0446* (2013.01); *H04B 1/713* (2013.01)

(58) Field of Classification Search
CPC ............. H04W 72/0446; H04W 52/08; H04W 52/221; H04W 52/325; H04W 52/48; H04W 72/0473; H04B 1/713
See application file for complete search history.

(56) References Cited

U.S. PATENT DOCUMENTS

| | | | | |
|---|---|---|---|---|
| 11,510,229 | B2 * | 11/2022 | Liu | H04W 52/146 |
| 2017/0302491 | A1 * | 10/2017 | Yang | H04W 72/23 |
| 2019/0254088 | A1 * | 8/2019 | Park | H04W 76/11 |
| 2019/0296809 | A1 * | 9/2019 | Li | H04W 72/20 |
| 2019/0313419 | A1 * | 10/2019 | Fakoorian | H04W 28/0278 |
| 2019/0319823 | A1 * | 10/2019 | Akkarakaran | H04W 76/27 |
| 2020/0052827 | A1 | 2/2020 | Vilaipornsawai et al. | |

(Continued)

OTHER PUBLICATIONS

"3rd Generation Partnership Project; Technical Specification Group Radio Access Network; NR; Physical channels and modulation (Release 17)", 3GPP TS 38.211 V17.1.0, Mar. 2022, 135 pages.

(Continued)

*Primary Examiner* — Khaled M Kassim
*Assistant Examiner* — Christopher A. Reyes

(57) ABSTRACT

Apparatuses and methods for transmission of uplink channels with frequency hopping. A method of a user equipment includes receiving first information indicating use of a same power for a transmission of a channel over different slots and second information indicating a first number of slots for the transmission of the channel. The method includes determining a first time window for the transmission of the channel based on the first and second information and a first power for the transmission of the channel over the first time window. The method further includes transmitting the channel over the first time window with the first power.

16 Claims, 22 Drawing Sheets

(56) References Cited

U.S. PATENT DOCUMENTS

| | | | | |
|---|---|---|---|---|
| 2020/0221478 | A1* | 7/2020 | Fakoorian | H04W 72/0446 |
| 2020/0305154 | A1* | 9/2020 | Wu | H04L 5/0042 |
| 2020/0350949 | A1* | 11/2020 | Rico Alvarino | H04L 5/0094 |
| 2020/0367208 | A1 | 11/2020 | Khoshnevisan et al. | |
| 2020/0404671 | A1* | 12/2020 | Karaki | H04W 72/1268 |
| 2021/0068130 | A1* | 3/2021 | Liu | H04W 72/0453 |
| 2021/0084673 | A1* | 3/2021 | Nguyen | H04W 72/1268 |
| 2023/0085606 | A1* | 3/2023 | Shao | H04L 5/0012 370/329 |

OTHER PUBLICATIONS

"3rd Generation Partnership Project; Technical Specification Group Radio Access Network; NR; Multiplexing and channel coding (Release 17)", 3GPP TS 38.212 V17.1.0, Mar. 2022, 197 pages.

"3rd Generation Partnership Project; Technical Specification Group Radio Access Network; NR; Physical layer procedures for control (Release 17)", 3GPP TS 38.213 V17.1.0, Mar. 2022, 245 pages.

"3rd Generation Partnership Project; Technical Specification Group Radio Access Network; NR; Physical layer procedures for data (Release 17)", 3GPP TS 38.214 V17.1.0, Mar. 2022, 225 pages.

"5G; Nr; Medium Access Control (MAC) protocol specification (3GPP TS 38.321 version 16.7.0 Release 16)", ETSI TS 138 321 V16.7.0, Jan. 2022, 160 pages.

"5G; Nr; Radio Resource Control (RRC); Protocol specification (3GPP TS 38.331 version 16.7.0 Release 16)", ETSI TS 138 331 V16.7.0, Jan. 2022, 950 pages.

International Search Report and Written Opinion issued Aug. 1, 2022 regarding International Application No. PCT/KR2022/006069, 7 pages.

Samsung, "Joint channel estimation for PUSCH", 3GPP TSG RAN WG1 #104bis-e, R1-2103253, Apr. 2021, 5 pages.

Wilus Inc., "Discussion on joint channel estimation for PUSCH", 3GPP TSG RAN WG1 #104b-e, R1-2103701, Apr. 2021, 5 pages.

Sharp, "Joint channel estimation for multi-slot PUSCH", 3GPP TSG RAN WG1 #104b-e, R1-2103481, Apr. 2021, 7 pages.

* cited by examiner

TRANSMISSION OF UPLINK CHANNELS WITH FREQUENCY HOPPING

CROSS-REFERENCE TO RELATED APPLICATION AND CLAIM OF PRIORITY

This application claims priority under 35 U.S.C. § 119(e) to U.S. Provisional Patent Application No. 63/181,066 filed on Apr. 28, 2021; U.S. Provisional Patent Application No. 63/254,394 filed on Oct. 11, 2021; U.S. Provisional Patent Application No. 63/281,040 filed on Nov. 18, 2021; U.S. Provisional Patent Application No. 63/301,871 filed on Jan. 21, 2022. The above-identified provisional patent applications are hereby incorporated by reference in their entirety.

TECHNICAL FIELD

The present disclosure relates generally to wireless communication systems and, more specifically, the present disclosure relates to transmission of uplink channels with frequency hopping.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to transmission of uplink channels with frequency hopping with a same power over a number of slots.

In one embodiment, a user equipment (UE) is provided. The UE includes a transceiver configured to receive first information indicating use of a same power for a transmission of a channel over different slots and second information indicating a first number of slots for the transmission of the channel. The UE further includes a processor operably coupled to the transceiver. The processor is configured to determine a first time window for the transmission of the channel based on the first and second information and a first power for the transmission of the channel over the first time window. The transceiver is further configured to transmit the channel over the first time window with the first power.

In another embodiment, a base station (BS) is provided. The BS includes a transceiver configured to transmit first information indicating use of a same power for a reception of a channel over different slots and second information indicating a first number of slots for the reception of the channel. The BS further includes a processor operably coupled to the transceiver. The processor is configured to determine a first time window for the reception of the channel based on the first and second information and a first power for the reception of the channel over the first time window. The transceiver is further configured to receive the channel over the first time window with the first power.

In yet another embodiment, a method is provided. The method includes receiving first information indicating use of a same power for a transmission of a channel over different slots and second information indicating a first number of slots for the transmission of the channel. The method includes determining a first time window for the transmission of the channel based on the first and second information and a first power for the transmission of the channel over the first time window. The method further includes transmitting the channel over the first time window with the first power.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
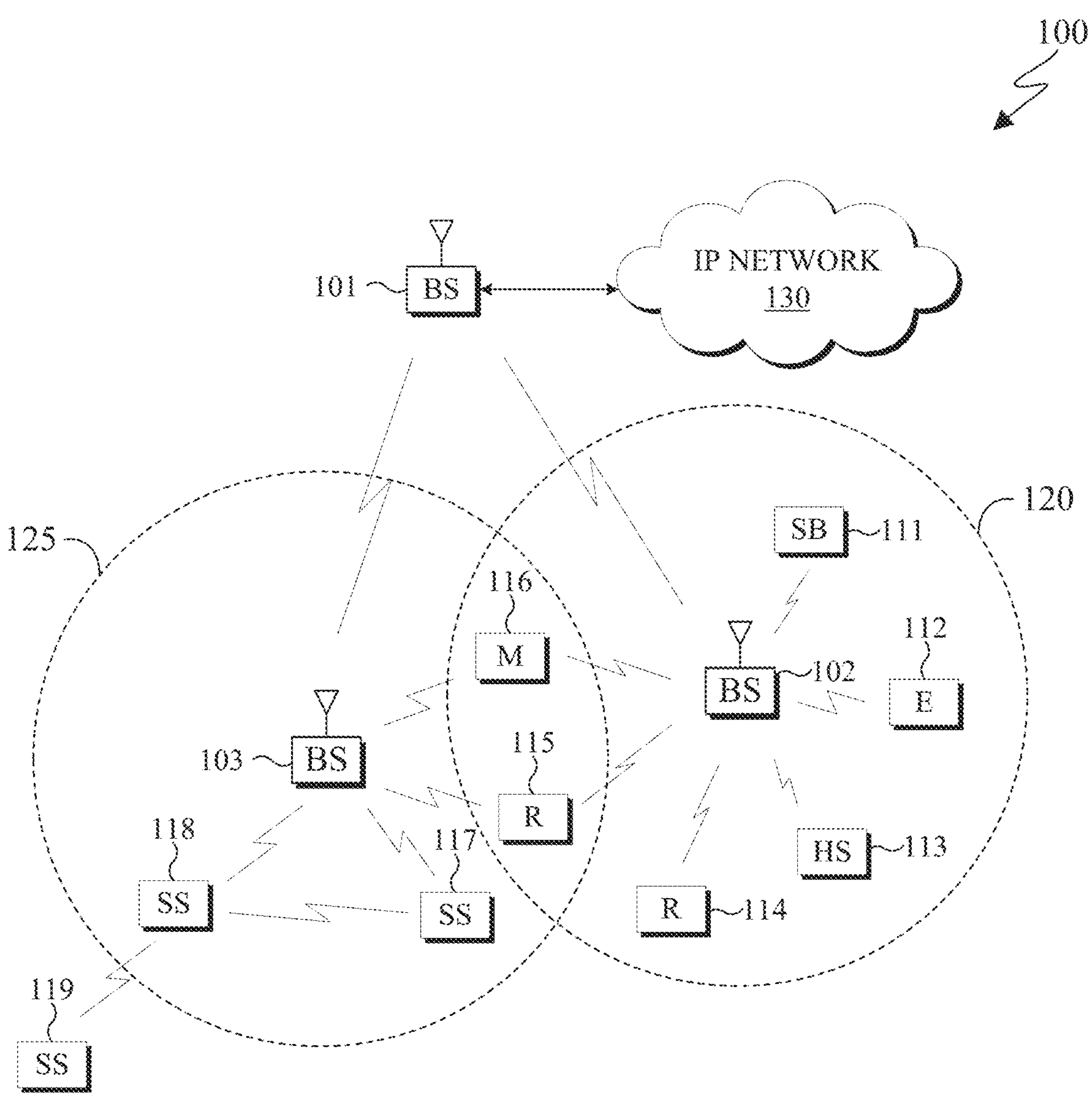
FIG. 1 illustrates an example wireless network according to embodiments of the present disclosure.

FIGS. 1 through 24, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v17.1.0, "NR; Physical channels and modulation" ("REF1"); 3GPP TS 38.212 v17.1.0, "NR; Multiplexing and channel coding" ("REF2"); 3GPP TS 38.213 v17.1.0, "NR; Physical layer procedures for control" ("REF3"); 3GPP TS 38.214 v17.1.0, "NR; Physical layer procedures for data" ("REF4"); 3GPP TS 38.321 v16.7.0, "NR; Medium Access Control (MAC).protocol specification" ("REF5"); and 3GPP TS 38.331 v16.7.0, "NR; Radio Resource Control (RRC) protocol specification" ("REF6").

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11 a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like. For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine). The UE may also be a car, a truck, a van, a drone, or any similar machine or a device in such machines.

Figure 2:
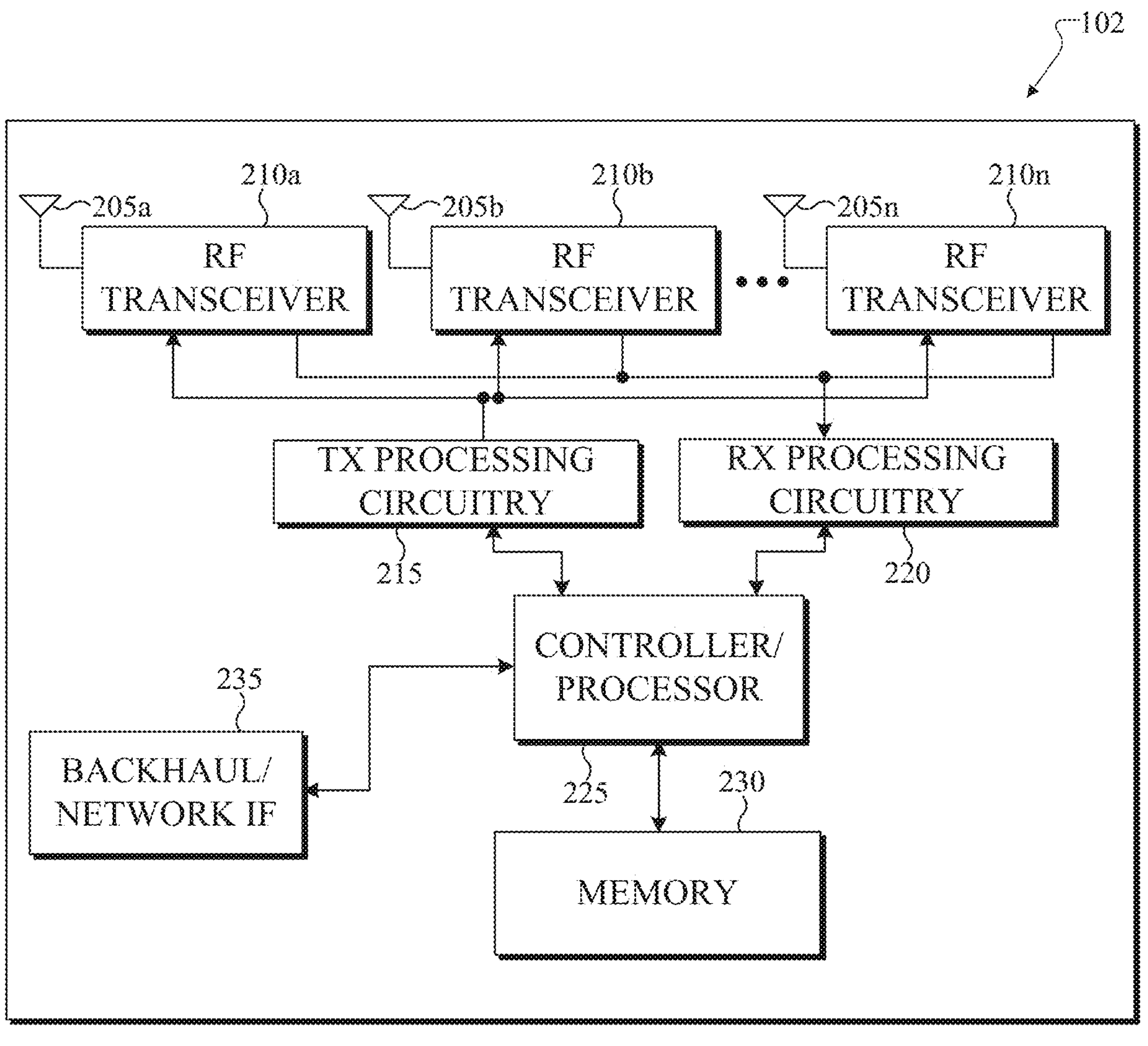
FIG. 2 illustrates an example BS according to embodiments of the present disclosure.
Figure 3:
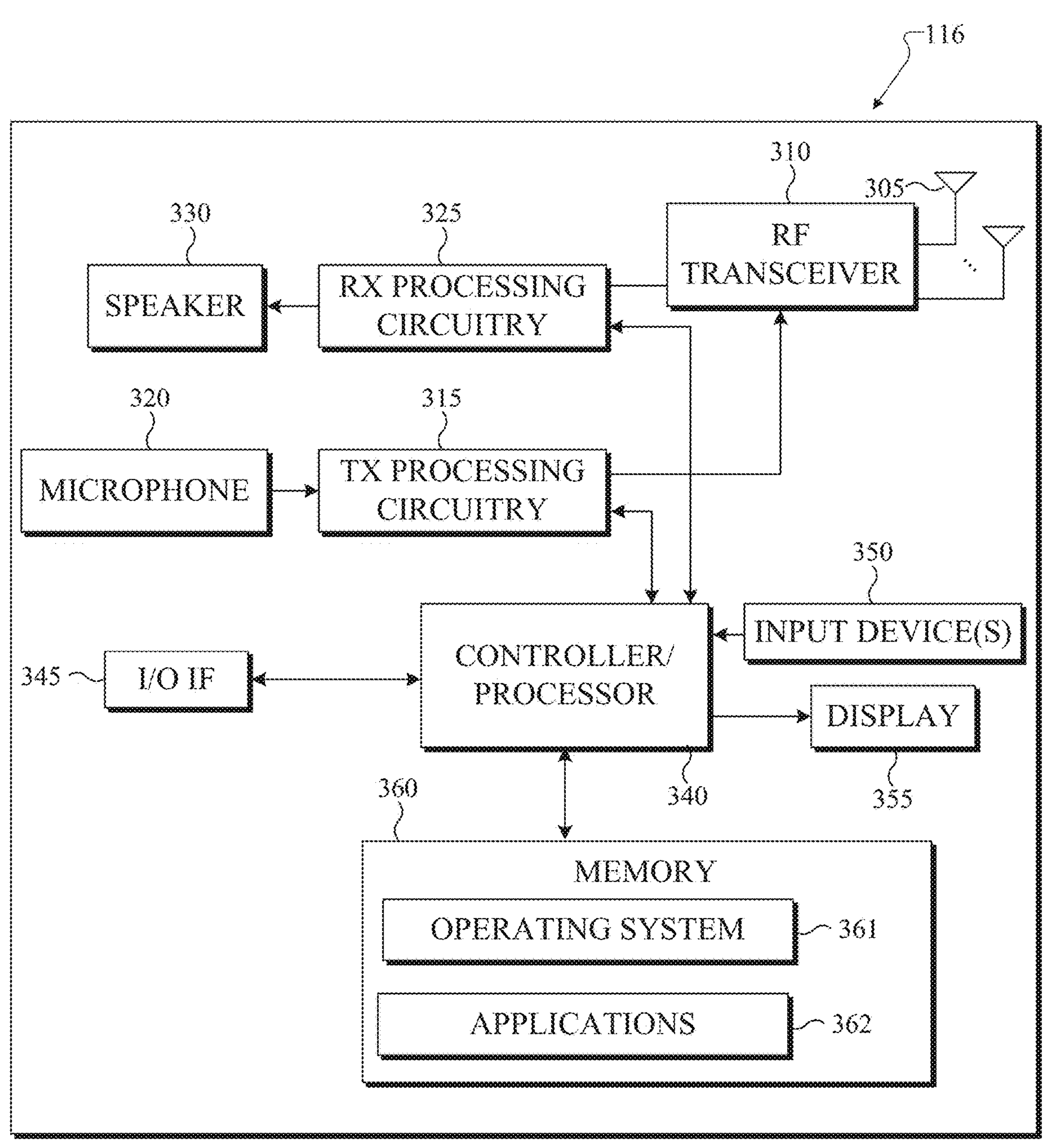
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes various gNodeB (bNG) such a base station, BS 101, a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115, the UE 116, the UE 117, and the UE 118. In some embodiments, one or more of the BSs 101-103 may communicate with each other and with the UEs 111-118 using 5G/NR, long term evolution (LTE), long term evolution-advanced (LTE-A), WiMAX, WiFi, or other wireless communication techniques.

In certain embodiments, multiple UEs (such as the UE 117, the UE 118, and the UE 119) may communicate directly with each other through device-2-device communication. In some embodiments, a UE, such as UE 119, is outside the coverage area of the network, but can communicate with other UEs inside the coverage area of the network, such as UE 118, or outside the coverage area of the network.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support the codebook design and structure for systems having 2D antenna arrays. Additionally, as described in more detail below, one or more of the UEs 111-119 include circuitry, circuitry, programing, or a combination thereof for transmission of uplink channels with frequency hopping. In certain embodiments, and one or more of the BSs 101-103 includes circuitry, programing, or a combination thereof for transmission of uplink channels with frequency hopping.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205*a*-205*n*, multiple radio frequency (RF) transceivers 210*a*-210*n*, transmit (TX) processing circuitry 215, and receive (RX) processing circuitry 220. The BS 102 also includes a controller/processor 225, a memory 230, and a backhaul or network interface 235.

The RF transceivers 210*a*-210*n* receive, from the antennas 205*a*-205*n*, incoming RF signals, such as signals transmitted by UEs in the wireless network 100. The RF transceivers 210*a*-210*n* down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210*a*-210*n* receive the outgoing processed baseband or IF signals from the TX processing circuitry 215 and up-converts the baseband or IF signals to RF signals that are transmitted via the antennas 205*a*-205*n*.

The controller/processor 225 can include one or more processors or other processing devices that control the overall operation of the BS 102. For example, the controller/processor 225 could control the reception of uplink channel signals and the transmission of downlink channel signals by the RF transceivers 210*a*-210*n*, the RX processing circuitry 220, and the TX processing circuitry 215 in accordance with well-known principles. The controller/processor 225 could support additional functions as well, such as more advanced wireless communication functions. For instance, the controller/processor 225 could support transmission of uplink channels with frequency hopping. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports communication between entities, such as web real time communications (RTC). For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

As described in more detail below, the transmit and receive paths of the BS 102 (implemented using the RF transceivers 210*a*-210*n*, TX processing circuitry 275, and/or RX processing circuitry 270) support communication with aggregation of frequency division duplex (FDD) cells and time division duplex (TDD) cells.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 and 117-119 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figures 4, 5:
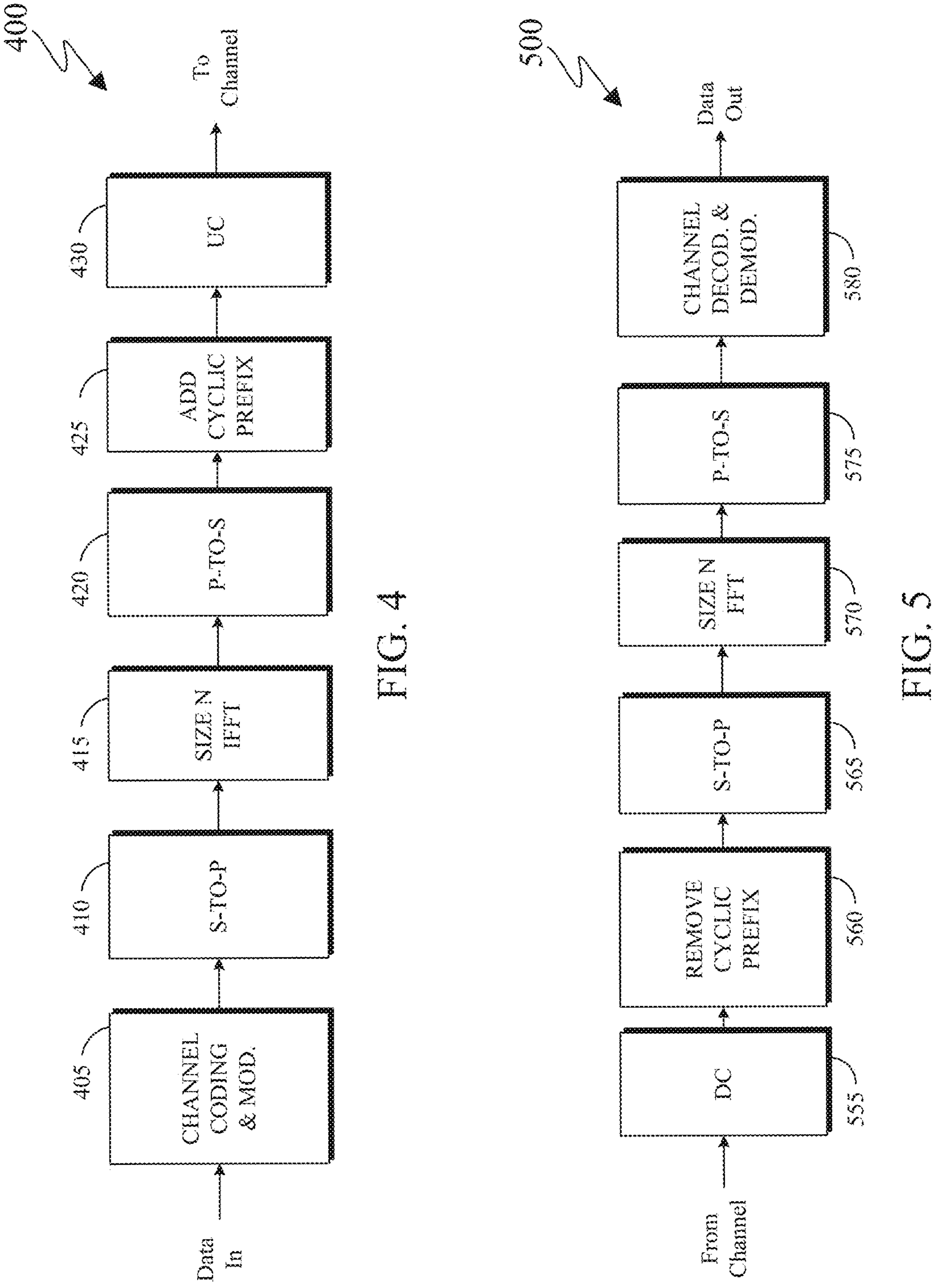
FIGS. 4 and 5 illustrate example wireless transmit and receive paths according to embodiments of the present disclosure.

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support transmission of uplink channels with frequency hopping. as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-118. Similarly, each of UEs 111-118 may implement the transmit path 400 for transmitting in the uplink to the BSs 101-103 and may implement the receive path 500 for receiving in the downlink from the BSs 101-103.

Furthermore, each of UEs 111-119 may implement a transmit path 400 for transmitting in the sidelink to another one of UEs 111-119 and may implement a receive path 500 for receiving in the sidelink from another one of UEs 111-119.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for downlink (DL) signaling or for uplink (UL) signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configuration y as 2-15 kHz. A unit of one sub-carrier over one symbol is referred to as resource element (RE). A unit of one RB over one symbol is referred to as physical RB (PRB).

DL signals include data signals conveying information content, control signals conveying DL control information (DCI), and reference signals (RS) that are also known as pilot signals. A gNB (such as BS 102) transmits data information or DCI through respective physical DL shared channels (PDSCHs) or physical DL control channels (PDCCHs). A PDSCH or a PDCCH can be transmitted over a variable number of slot symbols including one slot symbol.

A PDCCH transmission is over a number of control channel elements (CCEs) from a predetermined set of numbers of CCEs referred to as CCE aggregation level. A PDSCH transmission is scheduled by a DCI format or is semi-persistently scheduled (SPS) as configured by higher layers and activated by a DCI format. A PDSCH reception by a UE provides one or more transport blocks (TBs), wherein a TB is associated with a hybrid automatic repeat request (HARQ) process that is indicated by a HARQ process number field in a DCI format scheduling the PDSCH reception or activating a SPS PDSCH reception and a redundancy version (RV) that is indicated by a RV field in the DCI format when incremental redundancy is used for encoding the TB. A TB transmission can be an initial one or a retransmission as identified by a new data indicator (NDI) field in the DCI format scheduling a PDSCH reception that provides a TB retransmission for a given HARQ process number.

In certain embodiments, a gNB (such as BS 102) transmits one or more of multiple types of RS including channel state information RS (CSI-RS) and demodulation RS (DM-RS)—see also REF1.

A CSI-RS is primarily intended for UEs to perform measurements and provide channel state information (CSI) to a gNB. For channel measurement or for time tracking, non-zero power CSI-RS (NZP CSI-RS) resources are used. For interference measurement reports (IMRs), CSI interference measurement (CSI-IM) resources are used (see also REF3). The CSI-IM resources can also be associated with a zero power CSI-RS (ZP CSI-RS) configuration. A UE can determine CSI-RS reception parameters through DL control signaling or higher layer signaling, such as RRC signaling from a gNB (see also REF5). A DM-RS is typically transmitted only within a BW of a respective PDCCH or PDSCH and a UE can use the DM-RS to demodulate data or control information.

A UE (such as the UE 116) can monitor multiple candidate locations for respective potential PDCCH receptions to decode multiple DCI formats in a slot, for example as described in REF3. A DCI format includes cyclic redundancy check (CRC) bits in order for the UE to confirm a correct detection of the DCI format. A DCI format type is identified by a radio network temporary identifier (RNTI) that scrambles the CRC bits (see also REF2).

For a DCI format scheduling a PDSCH or a physical uplink shared channel (PUSCH) to a single UE, the RNTI can be a cell RNTI (C-RNTI), or a configured scheduling RNTI (CS-RNTI), or a modulation and coding scheme (MCS) cell RNTI (MCS-C-RNTI) and serves as a UE identifier. In the following, for brevity, only the C-RNTI will be referred to when needed. A UE (such as the UE 116) can receive/monitor PDCCH for detections of DCI formats with CRC scrambled by a C-RNTI according to a UE-specific search space (USS). For a DCI format 0_0 and a DCI format 1_0 that schedule PUSCH transmissions and PDSCH receptions, respectively, to a UE, the UE can additionally be configured to monitor corresponding PDCCH according to common search space (CSS). For a DCI format 0_1 and a DCI format 0_2 that are mainly used to schedule PUSCH transmissions or for a DCI format 1_1 and a DCI format 1_2 that are mainly used to schedule PDSCH receptions, the UE monitors corresponding PDCCH according to a USS. PDCCH monitoring implies reception of PDCCH candidates and decoding of potential DCI formats.

For a DCI format scheduling a PDSCH conveying system information (SI), the RNTI can be an SI-RNTI. For a DCI format scheduling a PDSCH providing a random access response (RAR), the RNTI can be an RA-RNTI. For a DCI format scheduling a PDSCH providing paging information, the RNTI can be a P-RNTI. A UE monitors PDCCH for these DCI formats according to a corresponding CSS on a primary cell. There are also a number of other RNTIs provided to a UE by UE-specific RRC signaling and are associated with DCI formats providing various control information and have corresponding PDCCHs that a UE monitors according to a Type-3 CSS on the primary cell or on a secondary cell. Such DCI formats include a DCI format 2_0 providing a structure of a slot in term of DL, UL or flexible/reserved symbols over a number of slots, a DCI format 22 providing transmit power control (TPC) commands for PUSCH or physical uplink control channel (PUCCH) transmissions, a DCI format 2_3 providing TPC commands for SRS transmissions and also potentially triggering a SRS transmission on a number of cells, and so on, and a corresponding CSS is referred to as Type3-PDCCH CSS.

In certain embodiments, UL signals also include data signals conveying information content, control signals conveying UL control information (UCI), DM-RS associated with data or UCI demodulation, phase-tracking RS (PT-RS) used for phase tracking in symbols of a PUSCH, and sounding RS (SRS) enabling a gNB to perform UL channel measurement, and a random access (RA) preamble enabling a UE to perform random access (see also REF1). A UE transmits data information or UCI through a respective physical UL shared channel (PUSCH) or a PUCCH. A PUSCH or a PUCCH can be transmitted over a variable number of symbols in a slot including one symbol. When a UE simultaneously transmits data information and UCI, the UE can multiplex both in a PUSCH or, depending on a UE capability, transmit both a PUSCH with data information and a PUCCH with UCI at least when the transmissions are on different cells.

Certain UL RS includes DM-RS, PT-RS, and SRS. DM-RS is typically transmitted within a BW of a respective PUSCH or PUCCH. A gNB (such as the BS 102) can use a DM-RS to demodulate information in a respective PUSCH or PUCCH. SRS is transmitted by a UE (such as the UE 116) to provide a gNB (such as the BS 102) with an UL CSI and, for a TDD system, to also provide a precoding matrix indicator (PMI) for DL transmission. Further, as part of a random access procedure or for other purposes, a UE can transmit a physical random access channel (PRACH).

UCI can include HARQ-acknowledgement (ACK) information, indicating correct or incorrect decoding of TBs or of code block groups (CBGs) in a PDSCH, scheduling request (SR) indicating whether a UE has data in its buffer to transmit, and CSI reports enabling a gNB to select appropriate parameters for PDSCH/TB or PDCCH/DCI format transmissions to a UE. A UE (such as the UE 116) transmits a PUCCH on a primary cell of a cell group. HARQ-ACK information is either a positive ACK when a TB decoding is correct or a negative acknowledgement (NACK) when a TB decoding is incorrect. An ACK can be represented by a binary '1' value and a NACK can be represented by a binary '0' value.

DL receptions and UL transmissions by a UE (such as the UE 116) can be configured to occur in a corresponding DL bandwidth part (BWP) and UL BWP. A DL/UL BWP is smaller than or equal to a DL/UL bandwidth of a serving cell. DL transmissions from a gNB and UL transmissions from a UE can be based on an orthogonal frequency division multiplexing (OFDM) waveform including a variant using DFT precoding that is known as DFT-spread-OFDM (see also REF1).

Figures 6, 7:
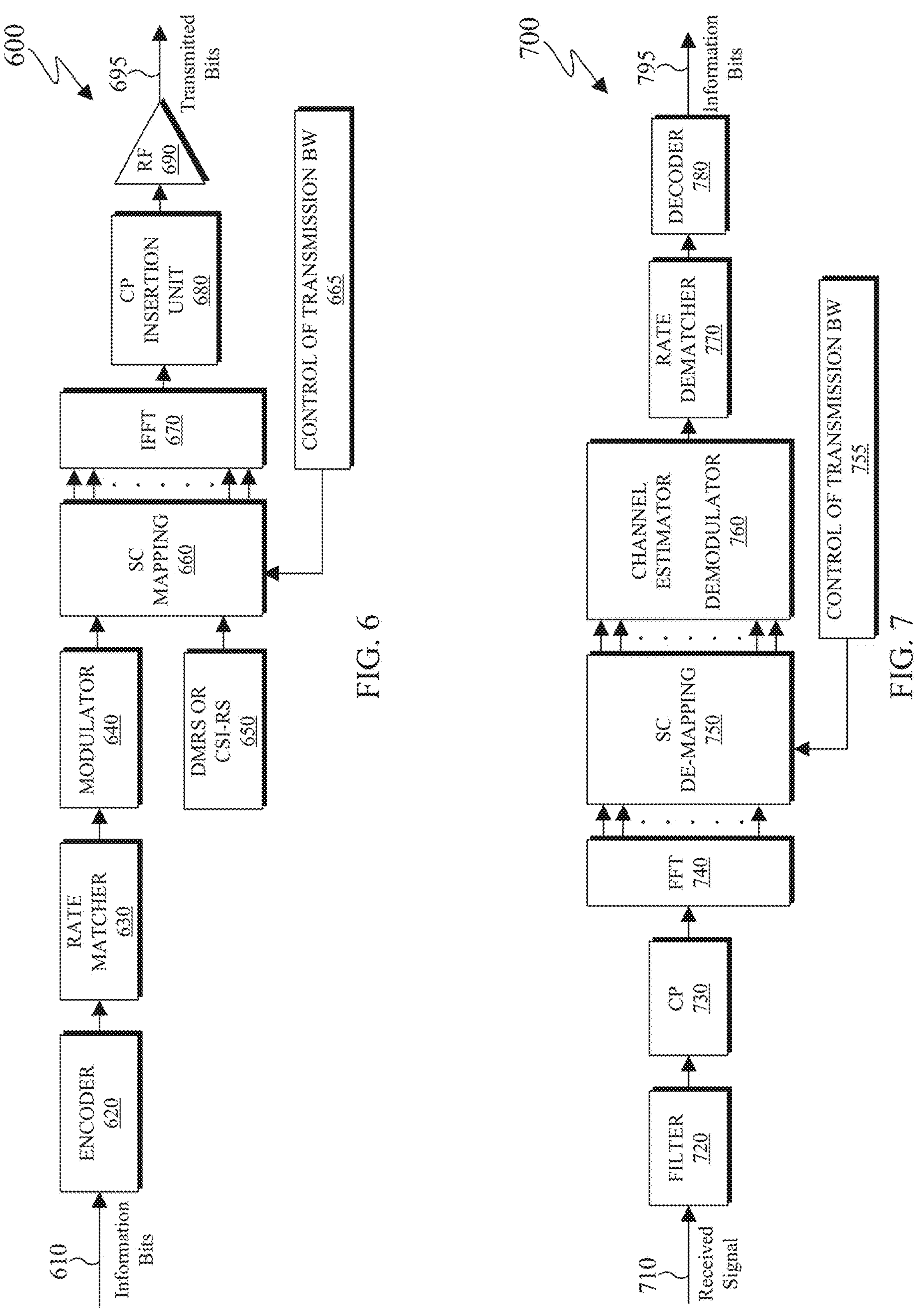
FIG. 6 illustrates a block diagram of an example transmitter structure using orthogonal frequency division multiplexing (OFDM) according to embodiments of the present disclosure.
FIG. 7 illustrates a block diagram of an example receiver structure using OFDM according to embodiments of the present disclosure.

FIG. 6 illustrates a block diagram 600 of an example transmitter structure using OFDM according to embodiments of the present disclosure. FIG. 7 illustrates a block diagram 700 of an example receiver structure using OFDM according to embodiments of the present disclosure.

The transmitter structure as shown in the block diagram 600 and the receiver structure as shown in the block diagram 700 can be similar to the RF transceivers 210*a*-210*n* of FIG. 2 and the RF transceiver 310 of FIG. 3. The example block diagram 600 of FIG. 6 and the block diagram 700 of FIG. 7 are for illustration only and other embodiments can be used without departing from the scope of the present disclosure.

As illustrated in the block diagram 600, information bits 610, such as DCI bits or data bits, are encoded by encoder 620, rate matched to assigned time/frequency resources by rate matcher 630 and modulated by modulator 640. Subsequently, modulated encoded symbols and demodulation reference signal (DMRS) or CSI-RS 650 are mapped to SCs by SC mapping unit 660 with input from BW selector unit 665, an IFFT is performed by filter 670, a cyclic prefix (CP) is added by CP insertion unit 680, and a resulting signal is filtered by filter 690 and transmitted by a radio frequency (RF) unit as transmitted bits 695.

As illustrated in the block diagram 700, a received signal 710 is filtered by filter 720, a CP removal unit 730 removes a CP, a filter 740 applies a fast FFT, SCs de-mapping unit 750 de-maps SCs selected by BW selector unit 755, received symbols are demodulated by a channel estimator and a demodulator unit 760, a rate de-matcher 770 restores a rate matching, and a decoder 780 decodes the resulting bits to provide information bits 790.

In certain embodiments, a UE (such as the UE 116) multiplexes HARQ-ACK information in a PUCCH that the UE transmits in a slot indicated by a value of PDSCH-to-HARQ_feedback timing indicator field in a last DCI format associated with the HARQ-ACK information, from a set of slot timing values $K_1$, or indicated by higher layers in case of a SPS PDSCH reception as described in REF3. When a UE has received a configuration of PUCCH resource sets, the UE determines a PUCCH resource set based on a UCI payload to multiplex in a PUCCH and determines a PUSCH resource within the PUCCH resource set based on a PUCCH resource index (PRI) in the DCI format.

A UE can also multiplex UCI in a PUSCH transmission. Then, the UE determines a number of UCI coded modulation symbols based on a number of UCI information bits, a spectral efficiency (or MCS) of the PUSCH transmission, and a scaling factor $\beta_{offset}^{PUSCH}$ as described in REF2. Among the REs available for UCI multiplexing in a PUSCH, such as all REs excluding REs in symbols prior to a first symbol with DM-RS REs or in symbols with DM-RS REs or excluding PT-RS REs, the UE can also be provided by higher layers a parameter a that limits a number of available REs that can be used for UCI multiplexing in a PUSCH as described in REF2. When the number of HARQ-ACK information bits is less than or equal to 2, a number of REs are reserved in the PUSCH for HARQ-ACK multiplexing, in order to avoid error events where a gNB expects HARQ-ACK information to be multiplexed in the PUSCH but the UE fails to detect an associated DCI format, and data information symbols that would be multiplexed in the reserved REs are punctured. When the number of HARQ-ACK information bits is larger than two, rate matching is used between data information symbols and HARQ-ACK information symbols. For CSI multiplexing in a PUSCH, CSI symbols are placed at a first PUSCH symbol that is not used for DM-RS multiplexing in the PUSCH.

In certain embodiments, a UE (such as the UE 116) does not expect to multiplex in a PUSCH transmission, or in a PUCCH transmission, HARQ-ACK information that the UE would transmit in different PUCCHs to a same TRP. For multiplexing of HARQ-ACK information in a PUSCH, coded modulation HARQ-ACK symbols are placed after a first symbol of the PUSCH that is used for DM-RS multiplexing or after the first consecutive DM-RS symbols. The multiplexing operation depends on a number of HARQ-ACK information bits. When a PUSCH is transmitted with frequency hopping, the above multiplexing of UCI symbols applies in each frequency hop.

When a gNB (such as the BS 102) schedules a UE (such as the UE 116) to transmit a PUSCH or PUCCH with a number of repetitions, the gNB can also indicate a number of slots $N_w$ as a time window over which the UE is expected to transmit with a constant power and phase. The number of slots $N_w$ can also be same as a number of consecutive slots where the UE transmits a number of repetitions without frequency hopping. For example, in order to maintain a same power for the PUSCH repetitions, the UE can be expected to not process TPC commands during the $N_w$ slots while in order to maintain a constant phase during the $N_w$ slots, the UE can be expected to apply a same precoding for the PUSCH or PUCCH repetitions during the $N_w$ slot. The number of slots can be same or different from the number of PUSCH repetitions. This operation is referred to herein as DM-RS bundling over a number of $N_w$ slots. The gNB can obtain a channel estimate for coherent demodulation of data/control symbols by filtering DM-RS symbols transmitted within the time window $N_w$ slots.

In certain embodiments, when a PUSCH or a PUCCH transmission is with repetitions and frequency hopping, a time window over which a UE (such as the UE 116) is expected to transmit with a constant power and phase can be defined to be same as or smaller than a time period where the UE transmits over a single frequency hop. A gNB (such as the BS 102) can configure a frequency hopping pattern that the UE can use for a PUSCH or a PUCCH transmission with repetitions. Based on the configured frequency hopping pattern and the indicated time window, the UE transmits with a constant power and phase over a number of repetitions or slots or symbols. In order to improve frequency resource allocation and enhance a scheduling flexibility of future frequency resources by a network, it would be beneficial for a gNB to indicate a frequency hopping pattern that a UE can use over a number of repetitions for a PUSCH or PUCCH transmission, or for a number of slots wherein, for a PUSCH, the transmission over a slot is a repetition of a same TB transmitted in at least another slot or is a transmission of a portion of a TB that is transmitted over multiple slots.

A UE (such as the UE 116) can operate in both TDD and FDD modes. Depending on whether the UE is in TDD or FDD mode, a frequency hopping pattern that changes more dynamically over time and/or that includes more frequency hops or locations in a given time period may be needed to improve performance by taking advantage of the frequency diversity of the channel. For example, an availability of slots for repetitions of a PUSCH or PUCCH transmission is typically time-invariable in FDD while it can depend on the slot of the first repetition(s) for a given UL-DL configuration in TDD. Also, a tradeoff between improving channel estimation versus increasing diversity from frequency hopping for a PUSCH or PUCCH transmission with repetitions by a UE can depend on a frequency selectivity of a channel medium and on signal-to-interference and noise ratio (SINR) experienced by the UE. Therefore, it is beneficial for a frequency hopping pattern to be UE-specific and to signal a frequency hopping pattern to each UE in a dynamic manner in order to quickly adapt to the channel medium variations that are experienced by the UE. In another example, when a UE operates in a supplementary uplink (SUL) band, uplink coverage is usually better than in a non-SUL band, hence also the frequency hopping pattern can be adapted to more favorable transmission conditions. Due to the different transmission conditions in TDD/FDD/SUL systems, it would be beneficial for a gNB to configure sets of frequency hopping patterns wherein a set includes frequency hopping patterns that, for example, can be optimized for transmission under certain conditions.

In certain embodiments, when a gNB (such as the BS 102) schedules a UE (such as the UE 116) to transmit a PUSCH or a PUCCH with a number of repetitions and with frequency hopping, and the gNB also indicates a number of slots as a time window over which the UE is expected to transmit repetitions with a constant power and phase, the number of slots can be same as a number of slots where the UE transmits a number of repetitions in same frequency resources. Here, the number of slots can also include non-consecutive slots. Similar to the case of consecutive slots without frequency hopping, in order to maintain a same power for PUSCH or PUCCH repetitions transmitted in same frequency resources, the UE does not process transmit power control (TPC) commands during the slots of the time window while in order to maintain a constant phase the UE applies a same precoding for the PUSCH or PUCCH repetitions during the slots of the time window. The number of slots of the time window can be same as or different from the number of slots for repetitions in same frequency resources of a frequency hop. This operation is referred in this disclosure as DM-RS bundling over a number of non-consecutive slots.

Accordingly, embodiments of the present disclosure take into consideration that there is a need to adapt a frequency pattern of a PUSCH or PUCCH transmission with repetitions to enhance a reception reliability for the PUSCH or PUCCH, improve a tradeoff between DM-RS bundling and frequency hopping, and enhance scheduling flexibility of frequency resources.

Embodiments of the present disclosure also take into consideration that there is a need to determine a frequency hopping pattern from a set of frequency hopping patterns for repetitions of a PUSCH or PUCCH transmission.

Embodiments of the present disclosure further take into consideration that there is a need to determine a number of slots where a UE is expected to transmit repetitions of a PUSCH or PUCCH transmission with constant power and phase.

It is noted that any reference to a PUSCH transmission with repetitions, the same or similar principles can apply to: (i) a PUCCH transmission with repetitions, (ii) a transmission of a TB over multiple slots, (iii) a transmission of a TB over multiple slots with TB repetitions, or (iv) a transmission of different TBs over a number of slots.

Embodiments of the present disclosure describe transmitting uplink channels with frequency hopping. This is described in the following examples and embodiments, such as those of FIGS. 8-11.

Figure 8:
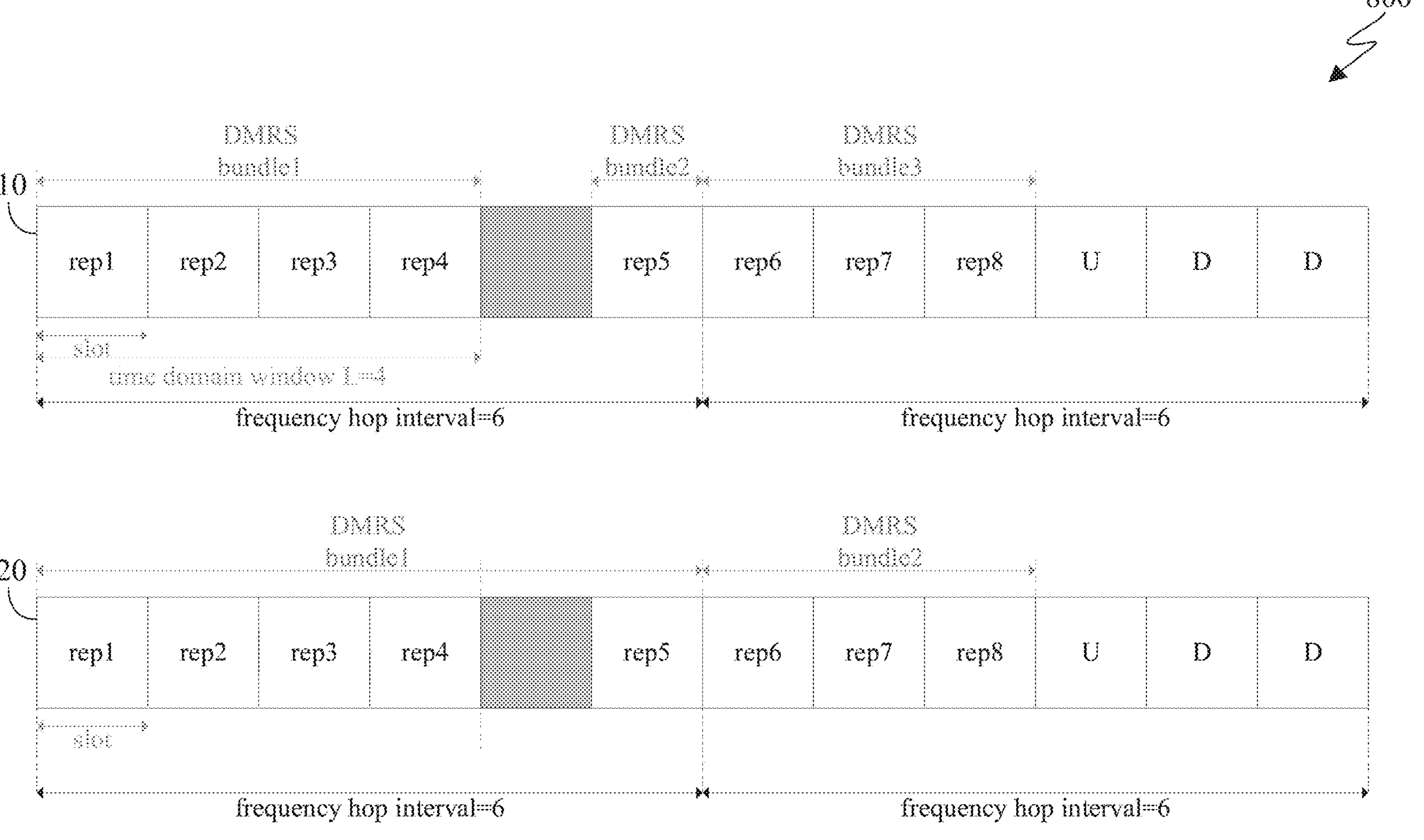
FIG. 8 illustrates example timing diagrams of time durations of a frequency hop according to embodiments of the present disclosure.
Figure 9:
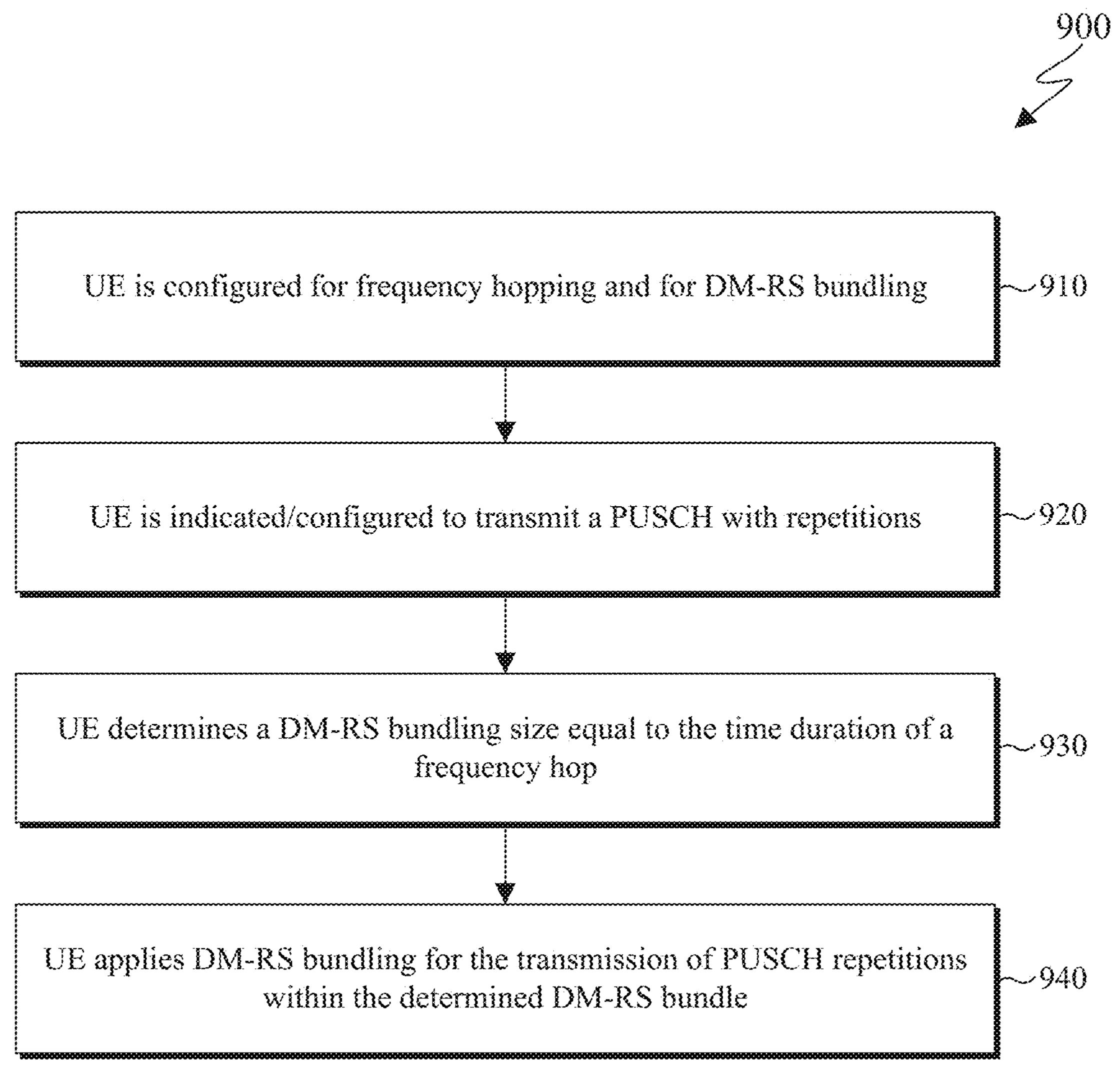
FIGS. 9-11 illustrate example methods for a UE configured to demodulation reference signal (DM-RS) bundling and for frequency hopping according to embodiments of the present disclosure.
Figure 10:
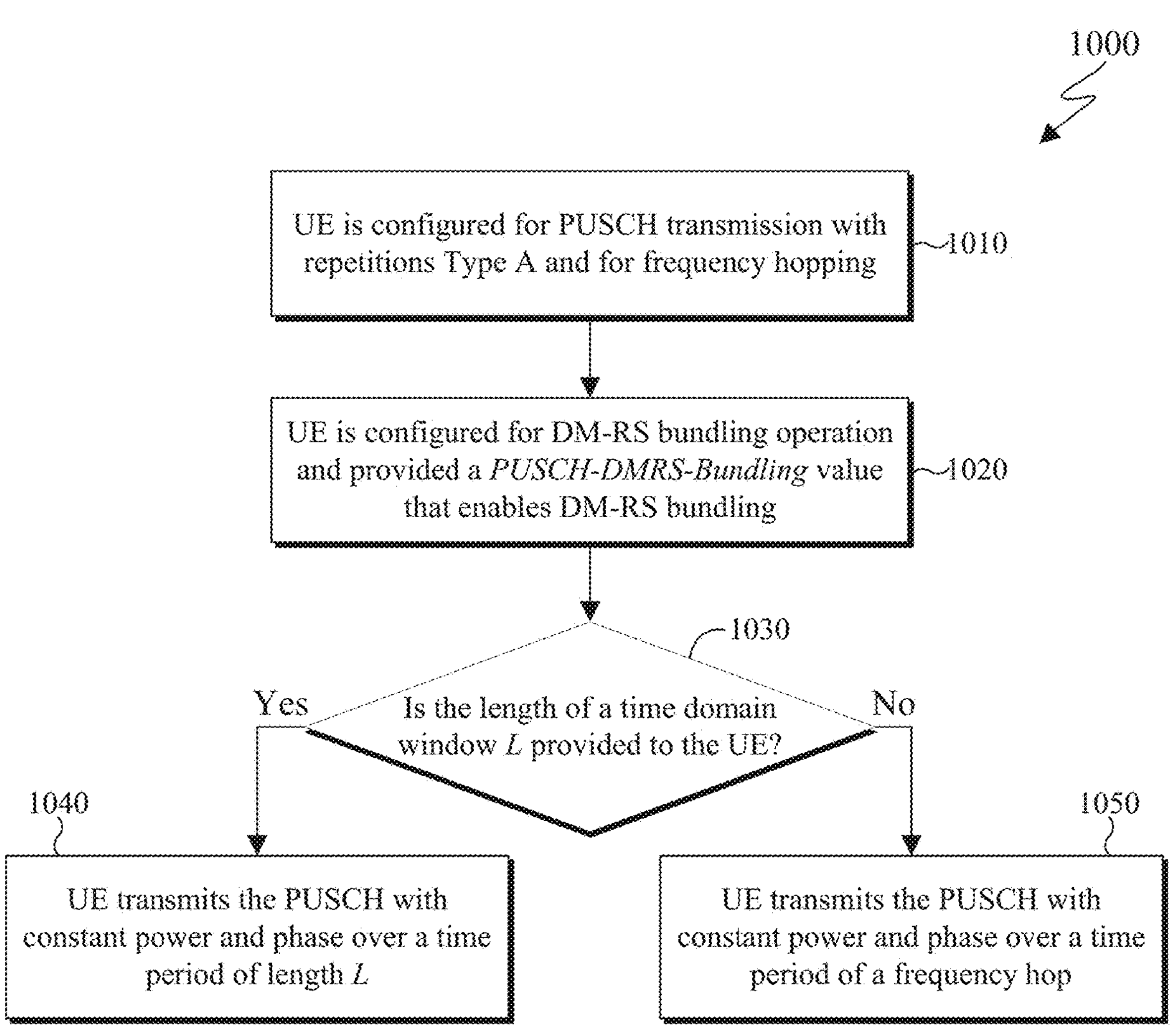
Figure 11:
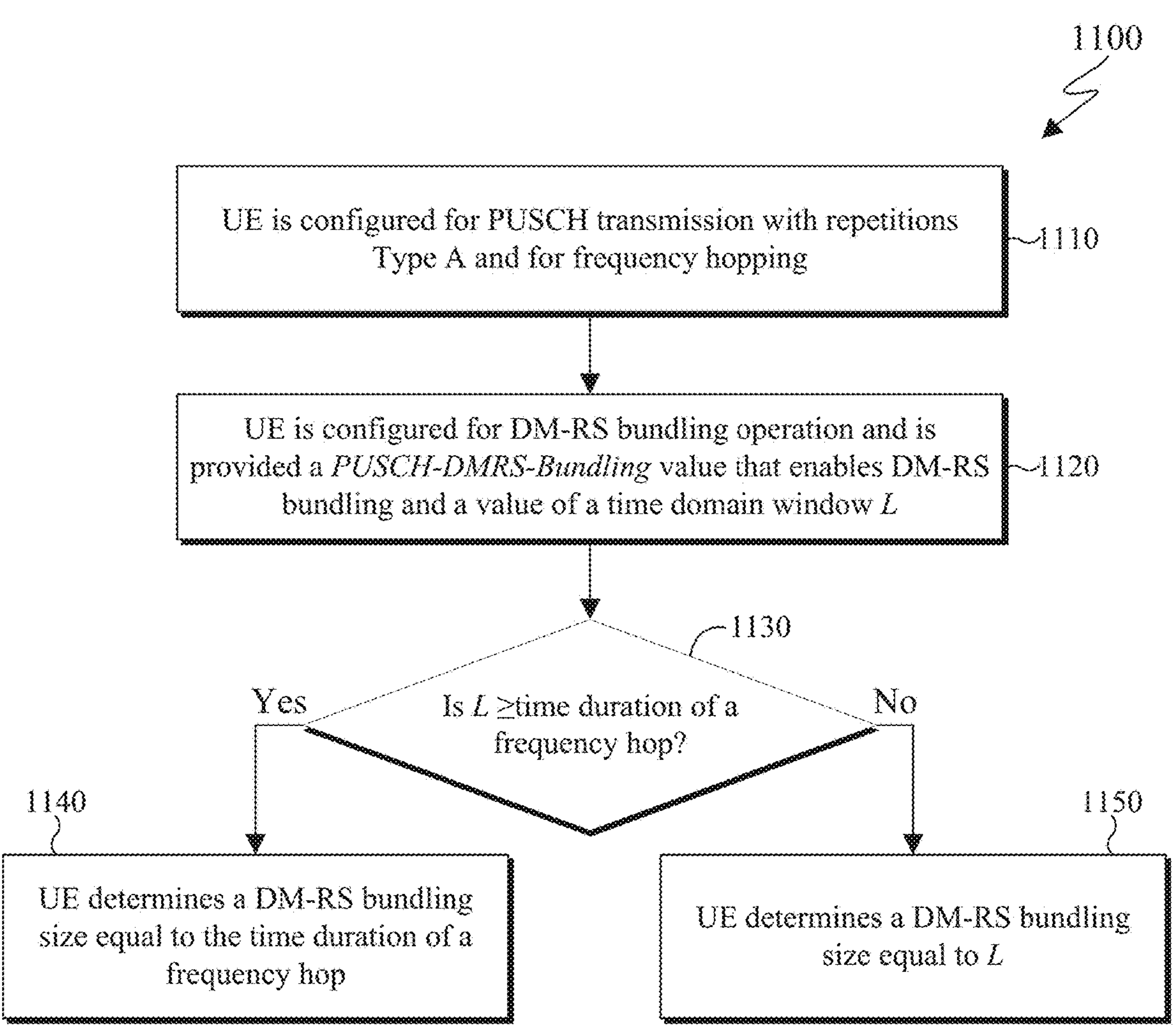

FIG. 8 illustrates an example of timing diagram 800 of time durations of a frequency hop according to embodiments of the present disclosure. FIGS. 9-11 illustrate example methods 900, 1000, and 1100, respectively, for a UE configured for DM-RS bundling and for frequency hopping according to embodiments of the present disclosure. The steps of the method 900 of FIG. 9, the method 1000 of FIG. 10, and the method 1100 of FIG. 11 can be performed by any of the UEs 111-119 of FIG. 1, such as the UE 116 of FIG. 3. The timing diagram 800 and the methods 900, 1000, and 1100 are for illustration only and other embodiments can be used without departing from the scope of the present disclosure.

In certain embodiments, a UE (such as the UE 116) is provided an UL-DL TDD configuration and is configured for DM-RS bundling. The UE can also be provided a length L of the time domain window for DM-RS bundling. Here L can be defined in time units of slots, symbols or repetitions.

When the UE is configured for frequency hopping for PUSCH repetition Type A (by the higher layer parameter frequencyHoppingDCI-0-2 in pusch-Config for PUSCH transmission scheduled by DCI format 0_2, or by frequencyHopping provided in pusch-Config for PUSCH transmission scheduled by a DCI format other than 0_2, or by frequencyHopping provided in configuredGrantConfig for configured PUSCH transmission) or is configured for frequency hopping for PUSCH repetition Type B (by the higher layer parameter frequencyHoppingDCI-0-2 in pusch-Config for PUSCH transmission scheduled by DCI format 0_2, or by frequencyHoppingDCI-0-1 provided in pusch-Config for PUSCH transmission scheduled by DCI format 0_1, or by frequencyHoppingPUSCH-RepTypeB provided in rrc-ConfiguredUplinkGrant for Type 1 configured PUSCH transmission), and is provided L, the time period over which the UE maintains same transmit power and phase consistency is equal to L time units. If L is not provided, the time period over which the UE maintains same transmit power and phase consistency is the duration of a frequency hop N. Hence, if the UE is provided a value of PUSCH-DMRS-Bundling parameter that enables DM-RS bundling, for the transmission of PUSCH repetitions within the duration of a frequency hop the UE does not apply accumulated TPC commands and/or maintains a same precoding and/or same spatial filter for the transmission of the repetitions.

In certain embodiments, a UE (such as the UE 116) is configured for frequency hopping and is also configured for DM-RS bundling with a length L of the time domain window for DM-RS bundling. Here, the time interval over which the UE performs DM-RS bundling would be limited by the duration of a frequency hop N if L is larger than N. If L is smaller than N, PUSCH repetitions within the time interval L are part of a first DM-RS bundle, and the remaining repetitions within the time duration of the frequency hop are part of a second DM-RS bundle or more DM-RS bundles. The second DM-RS bundle, similar to other DM-RS bundles, is subject to the maximum length L. Thus, the UE is not expected to be configured with the length of the time domain window for DM-RS bundling L larger than the time duration of a frequency hop N.

FIG. 8 illustrates example timing diagram 800 of time durations of a frequency hop of six slots and a transmission of a PUSCH with eight repetitions. The timing diagram 800 includes a case 810 and a case 820. As illustrated, slot five is unavailable for transmission of a PUSCH repetition. The unavailability of slot five can be determined by an UL-DL TDD configuration, and/or an overlapping with a scheduled or configured transmission of higher priority, and/or an indication by a slot form indicator (SFI).

In the case 810, a UE (such as the UE 116) is provided a length L of the time domain window for DM-RS bundling of four slots. Since L is smaller than the duration of a frequency hop, the maximum DM-RS bundle size would equal to L. The UE applies a first DM-RS bundle of four slots for the first four repetitions and a second DM-RS bundle in a first frequency hop, and applies a third DM-RS bundle to the remaining three repetitions transmitted in a second frequency hop. The second DM-RS bundle would include a single DM-RS and is equivalent to not using DM-RS bundling for the fifth repetition of the PUSCH in slot six.

In the case 820, a UE (such as the UE 116) is not provided L. The UE applies a first DM-RS bundle comprising all slots in a first frequency hop, and applies a second DM-RS bundle to the remaining three repetitions transmitted in a second frequency hop. The applicability of a DM-RS bundle over non-consecutive slots can be subject to other restrictions, such as the maximum gap between in slots or symbols between two consecutive repetitions. In the case 820 it is assumed that a gap of one slot between consecutive repetitions in a DM-RS bundle is allowed and a DM-RS bundle can include repetitions before and after such gap. When the gap of one slot is not allowed, the UE applies a first DM-RS bundling over repetitions before the gap and a second DM-RS bundling over repetitions after the bundle.

A UE (such as the UE 116) can be configured for DM-RS bundling and L is not provided. In this example, when a UE is configured for PUSCH transmission with inter-slot frequency hopping and repetitions Type A, and is scheduled by a DCI format to transmit the PUSCH over a number of physical or available slots, wherein an available slot is a slot available for transmission of a PUSCH repetition as indicated by an UL-DL configuration and/or by an indication in a DCI format or in a PDSCH, and is configured with DM-RS bundling operation and L is not provided, the UE performs DM-RS bundling over a time period of a frequency hop corresponding to a frequency hopping scheme indicated by frequencyHopping and to a set of frequency hopping patterns configured by frequencyHoppingOffsetLists wherein frequencyHopping and frequencyHoppingOffsetLists apply to DCI format 0_0 and 0_1 for 'pusch-RepTypeA'.

A UE (such as the UE 116) can be is configured for DM-RS bundling and L is not provided. In this example, when the UE is configured for PUSCH transmission with repetitions Type B, the UE performs DM-RS bundling over a time period of a frequency hop corresponding to a frequency hopping scheme indicated by frequencyHoppingDCI-0-1 and to a set of frequency hopping patterns configured by frequencyHoppingOffsetListsDCI-0-1, wherein frequencyHoppingDCI-0-1 and frequencyHoppingOffsetListsDCI-0-1 apply to DCI format 0_1 for 'pusch-RepTypeB'.

A UE (such as the UE 116) can be configured for DM-RS bundling and L is not provided, and the UE is configured for type 2 configured grant activation. In this example, the UE performs DM-RS bundling over a time period of a frequency hop corresponding to a frequency hopping scheme indicated by frequencyHoppingDCI-0-2 and to a set of frequency hopping patterns configured by frequencyHoppingOffsetListsDCI-0-2 that applies to DCI format 0_2. When pusch-RepTypeIndicatorDCI-0-2 is set to 'pusch-RepTypeA', the frequency hopping scheme can be chosen between 'intra-slot frequency hopping and 'inter-slot frequency hopping' if enabled. When pusch-RepTypeIndicatorDCI-0-2 is set to 'pusch-RepTypeB', the frequency hopping scheme can be chosen between 'inter-repetition frequency hopping' and 'inter-slot frequency hopping' if enabled.

The method 900 as illustrated in FIG. 9 describes an example procedure for a UE configured for DM-RS bundling and for frequency hopping according to the disclosure.

In step 910, a UE (such as the UE 116) is configured for frequency hopping and for DM-RS bundling. In step 920, the UE is indicated/configured to transmit a PUSCH with repetitions. In step 930, the UE determines a DM-RS bundling size equal to the time duration of a frequency hop. In step 940, the UE applies DM-RS bundling for the transmission of PUSCH repetitions within the determined DM-RS bundle.

The method 1000 as illustrated in FIG. 10 describes an example procedure for a UE configured for DM-RS bundling and for frequency hopping according to the disclosure.

In step 1010, a UE (such as the UE 116) is configured for PUSCH transmission with repetitions Type A and for frequency hopping. In step 1020, the UE is configured for DM-RS bundling operation and provided a PUSCH-DMRS-Bundling parameter value that enables DM-RS bundling. In step 1030, the UE determines whether the length of a time domain window L provided. When the length of a time domain window for DM-RS bundling L is provided to the UE (as determined in step 1030), the UE in step 1040 transmits the PUSCH with constant power and phase over a time period of length L. Alternatively, when the length of the time domain window for DM-RS bundling L is not provided (as determined in step 1030), the UE in step 1050 transmits the PUSCH with constant power and phase over a time period of a frequency hop.

The method 1100 as illustrated in FIG. 11 describes an example procedure for a UE configured for DM-RS bundling and for frequency hopping according to the disclosure.

In step 1110, a UE (such as the UE 116) is configured for PUSCH transmission with repetitions Type A and for frequency hopping. In step 1120, the UE is configured for DM-RS bundling operation and is provided a PUSCH-DMRS-Bundling parameter value that enables DM-RS bundling and a value of a time domain window L. In step 1130, the UE determines whether L is ≥time duration of a frequency hop. When L is ≥time duration of a frequency hop (as determined in step 1130), the UE in step 1140 determines a DM-RS bundling size equal to the time duration of a frequency hop. When L is smaller than the time duration of a frequency hop (as determined in step 1130), the UE in step 1150 determines a DM-RS bundling size equal to L.

In certain embodiments, after a UE (such as the UE 116) determines a DM-RS bundling size comprising a number of consecutive slots, it is possible that some of the slots within the determined DM-RS bundle are not available for uplink transmission. For example, the DM-RS bundling size can be (i) equal to a configured time domain length L (such as in step 1150 of FIG. 11), or (ii) equal to a time duration of a frequency hop (such as in step 1140 of FIG. 11), then it is possible that some of the slots within the determined DM-RS bundle are not available for uplink transmission. Whether the UE applies DM-RS bundling over all repetitions in the determined DM-RS bundle or over portions of the repetitions, for example repetitions before the unavailable slot are a first DM-RS bundle and repetitions after the unavailable slot are a second DM-RS bundle, can be subject to other conditions. For example, one condition can be that the transmission gap between two consecutive repetitions is not larger than one slot or not larger than one or more symbols.

It is noted that the embodiments described for a PUSCH transmission are also applicable to a PUCCH transmission. For example, when a UE (such as the UE 116) is configured for DM-RS bundling operation for PUSCH transmission and provided a PUSCH-DMRS-Bundling parameter, the UE can also be configured for DM-RS bundling operation for PUCCH transmission and provided a PUCCH-DMRS-Bundling parameter. The UE can be provided a first length of the time domain window for DM-RS bundling for PUSCH transmission and a second length of the time domain window for DM-RS bundling for PUCCH transmission, wherein the first and second length can be same or different. It is also possible that the length of the time domain window is only provided for PUSCH transmission and not for PUCCH transmission, and DM-RS bundling for PUCCH would be applied, subject to other conditions, over a time duration of a frequency hop or over a number of repetitions. It is also possible that a UE is configured for DM-RS bundling for both PUSCH and PUCCH and provided a DMRS-Bundling parameter that can enable DM-RS bundling for both PUSCH and PUCCH transmission, with a same length of a time domain window, if provided.

Although FIG. 8 illustrates the timing diagram 800, FIG. 9 illustrates the method 900, FIG. 10 illustrates the method 1000, and FIG. 11 illustrates the method 1100 various changes may be made to FIGS. 8-11. For example, while the method 900, the method 1000, and the method 1100 are shown as a series of steps, various steps could overlap, occur in parallel, occur in a different order, or occur multiple times. In another example, steps may be omitted or replaced by other steps. For example, steps of the method 900, the method 1000, and the method 1100 can be executed in a different order.

Embodiments of the present disclosure also describe indicating a frequency hopping pattern from a set of patterns and configuring sets of frequency hopping patterns. This is described in the following examples and embodiments, such as those of FIGS. 12-15.

Figure 12:
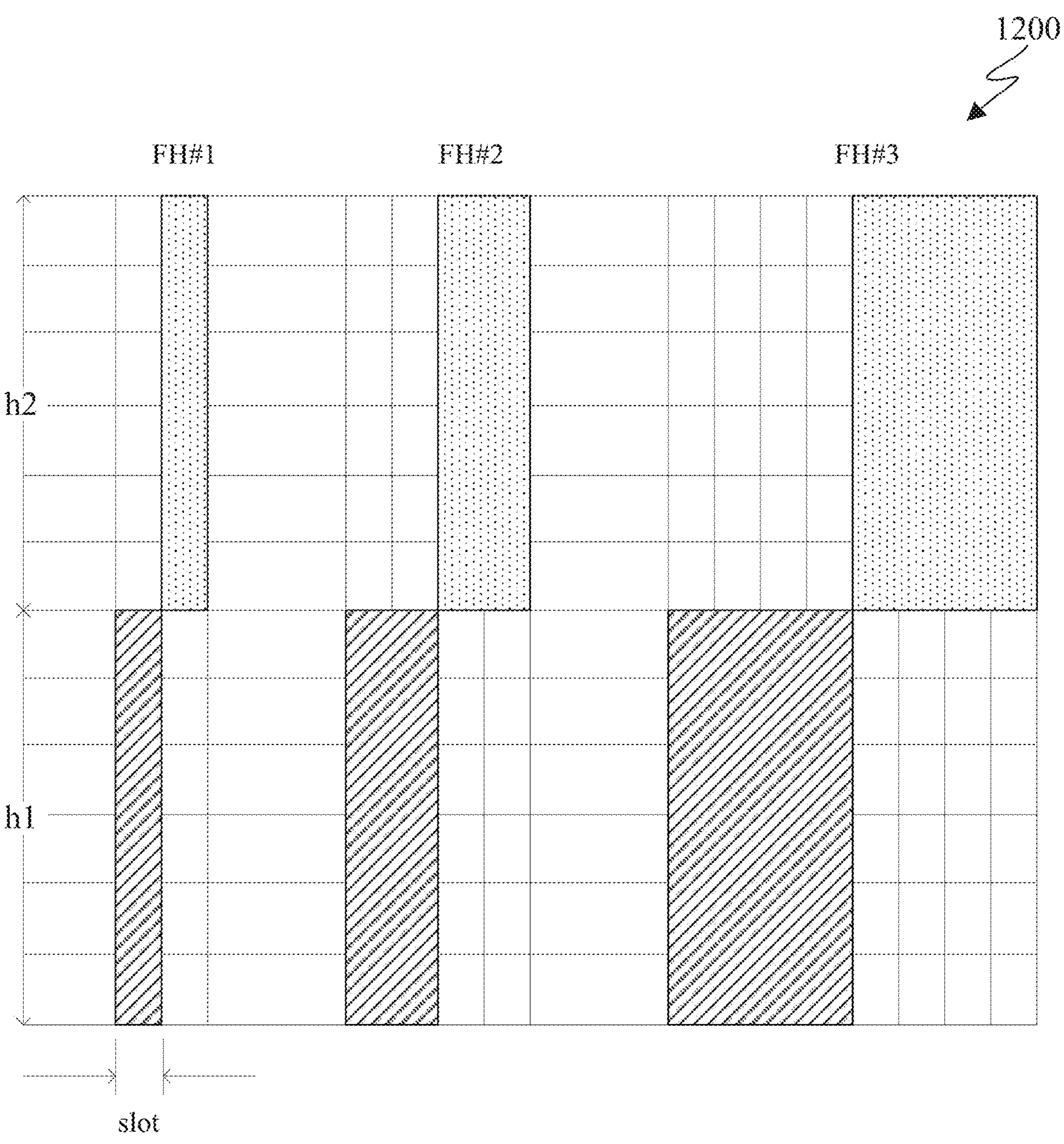
FIG. 12 illustrates an example set of frequency hopping patterns according to embodiments of the present disclosure.
Figure 13:
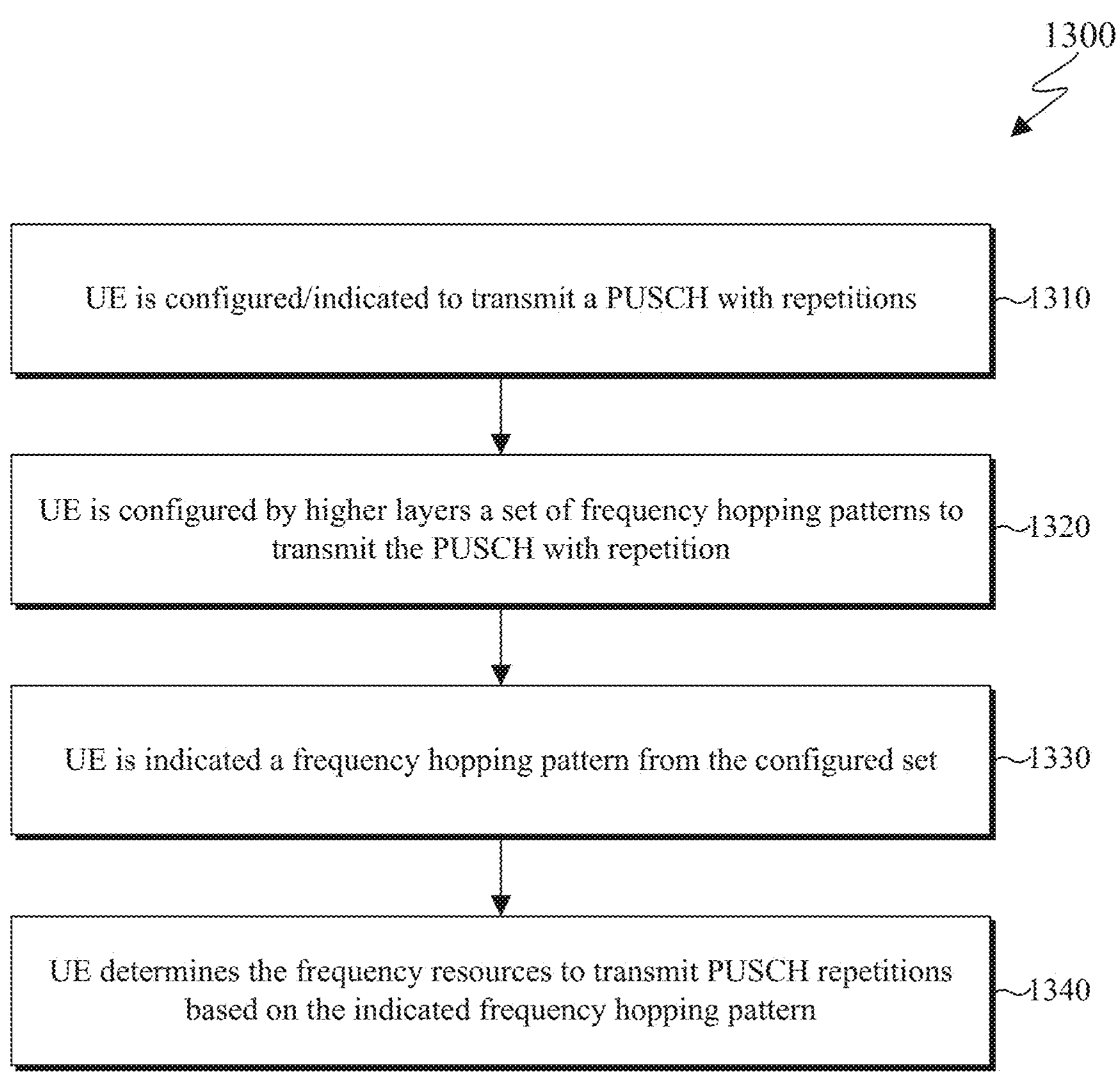
FIGS. 13-15 illustrate example methods for determining a frequency hopping pattern for a physical uplink shared channel (PUSCH) transmission with repetitions according to embodiments of the present disclosure.
Figure 14:
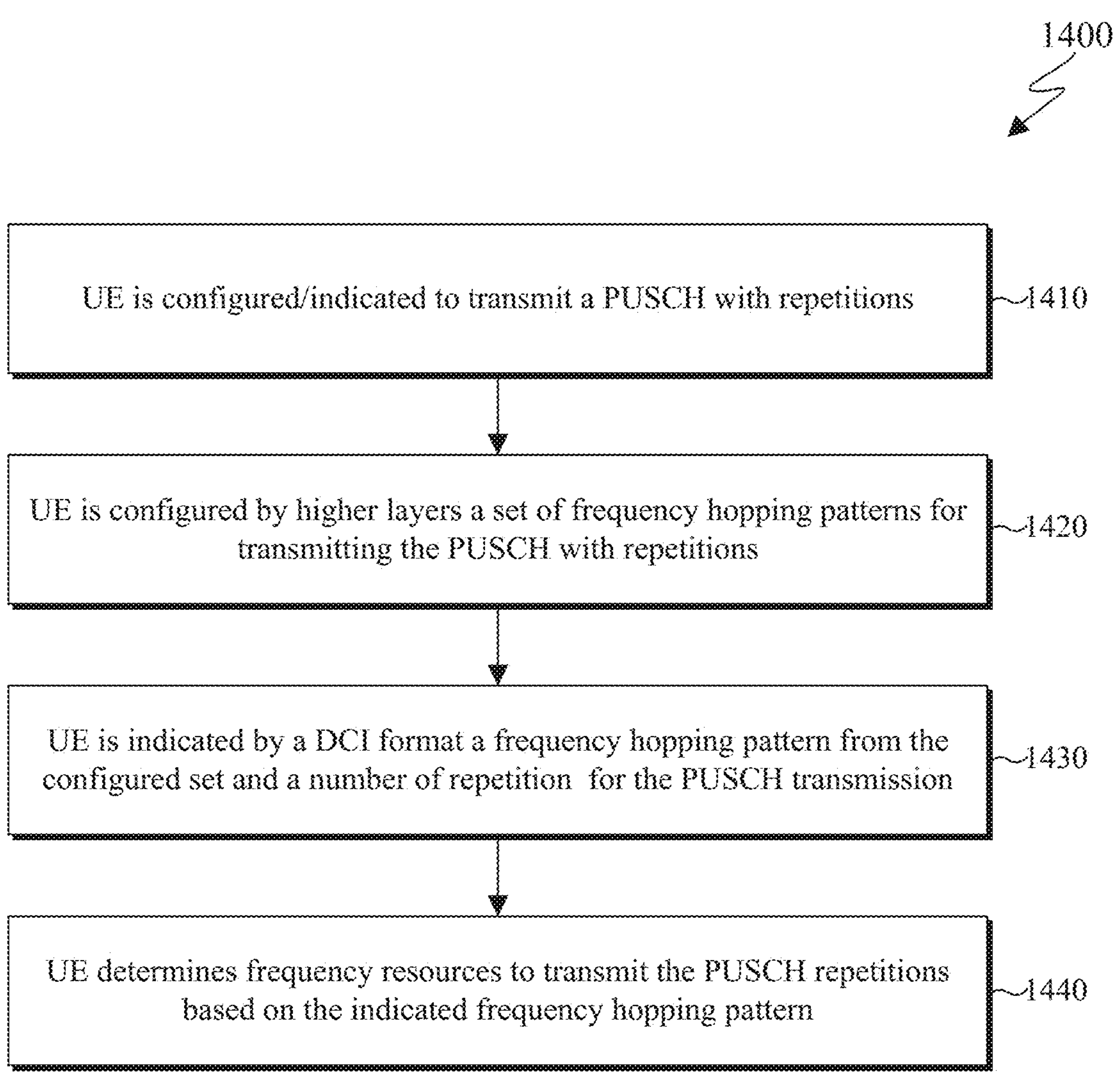
Figure 15:
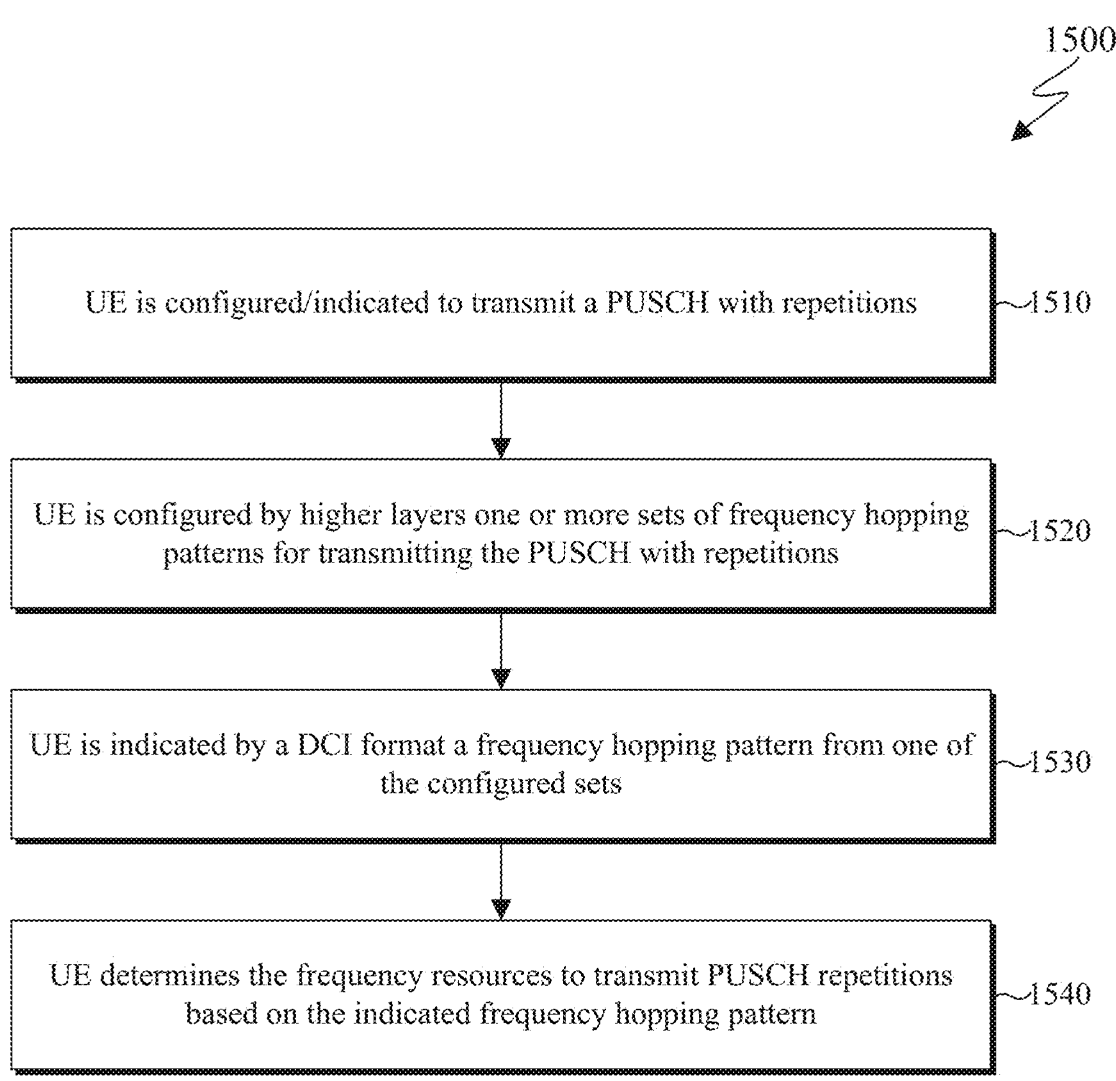

FIG. 12 illustrates a diagram 1200 of an example set of frequency hopping patterns according to embodiments of the present disclosure. FIGS. 13-15 illustrate example methods 1300, 1400, and 1500, respectively, for determining a frequency hopping pattern for a PUSCH transmission with repetitions according to embodiments of the present disclosure. The steps of the method 1300 of FIG. 13, the method 1400 of FIG. 14, and the method 1500 of FIG. 15 can be performed by any of the UEs 111-119 of FIG. 1, such as the UE 116 of FIG. 3. The diagram 1200 and methods 1300, 1400, and 1500 are for illustration only and other embodiments can be used without departing from the scope of the present disclosure.

In certain embodiments, a gNB (such as the BS 102) can schedule a UE (such as the UE 116) to transmit a PUSCH with a number of repetitions over a number $N_{rep}$ of corresponding slots and also indicate a number $N_w$ of slots, from the $N_{rep}$ slots, that defines a size of a DM-RS bundle where a UE is expected to transmit with same power and phase. It is also possible that the number of $N_w$ slots are not directly indicated but is instead determined based on a number of repetitions. For example, for $N_{rep}$ repetitions over two frequency hopping intervals, the number of $N_w$ slots is described in Equation (1). A PUSCH reception reliability can be improved with additional frequency diversity provided by transmitting the PUSCH with frequency hopping. A gNB can schedule a UE to transmit a PUSCH with repetitions and with frequency hopping, and indicate a frequency hopping pattern from a configured set of patterns.

$$N_w = N_{rep}/4 \text{ or } N_w = N_{rep}/2 \quad (1)$$

In certain embodiments, a gNB (such as the BS 102) can configure to a UE (such as the UE 116) a set of frequency hopping patterns by higher layer parameter in PUSCH-Config Information Element (IE) or in rrc-ConfiguredUplinkGrant IE. The gNB can indicate one or more of the frequency hopping patterns from the set of configured frequency hopping patterns for the UE to use for transmitting one or more PUSCH repetitions, or for transmitting over one or more slots, or for transmitting over one or more groups of symbols. For PUSCH repetition Type B, a group of symbols can be the symbols in one or more repetitions.

In a first approach a gNB (such as the BS 102) indicates a frequency hopping pattern from a set of frequency hopping patterns wherein the set includes a first pattern that corresponds to frequency hopping in every repetition, a second pattern corresponds to frequency hopping every two repetitions, a third pattern corresponds to frequency hopping every four repetitions, and so on. It is also possible that a pattern is defined per number of slots instead per number of repetitions.

The diagram 1200 as illustrated in FIG. 12 describes an example of a set of frequency hopping patterns with three patterns, wherein a duration of a frequency hop in pattern #1 (FH #1) is equal to one repetition (or one slot), a duration of a frequency hop in pattern #2 (FH #2) is equal to two repetitions (or two slots), and a duration of a frequency hop in pattern #3 (FH #3) is equal to four repetitions (or four slots). A fourth pattern can have a duration equal to half the number of repetitions (or slots) for a PUCCH transmission. In another example, a set of frequency hopping patterns comprises patterns wherein a first pattern includes frequencies that do not overlap with frequencies of a second pattern.

In certain embodiments, a gNB (such as the BS 102) can indicate one of the frequency hopping patterns and a number of repetitions or slots over which the UE uses the indicated pattern. It is also possible that the number of repetitions/slots $N_w$ that defines a size of a DM-RS bundle is same as the number of repetitions/slots per frequency hop in the indicated frequency hopping pattern. It is also possible that, when not otherwise indicated and the UE is configured to transmit PUSCH repetitions with frequency hopping, the number of repetitions/slots per frequency hop is equal to half the number of repetitions $N_{rep}$.

In a second approach a gNB (such as the BS 102) indicates two frequency hopping patterns from a set of frequency hopping patterns. A UE (such as the UE 116) can transmit PUSCH repetitions alternating transmission of one repetition over the frequency resources indicated by the first pattern and transmitting a next repetition over the frequency resources indicated by the second pattern. A UE (such as the UE 116) can also transmit more than one repetition in the frequency resources of an indicated pattern.

The method 1300 as illustrated in FIG. 13 describes an example procedure for a UE to determine a frequency hopping pattern for a PUSCH transmission with repetitions according to the disclosure.

In step 1310, a UE (such as the UE 116) is configured by higher layers or indicated by a DCI format (configured/indicated) to transmit a PUSCH with repetitions. In step 1320, the UE is configured by higher layers a set of frequency hopping patterns to transmit the PUSCH with repetitions. In step 1330, the UE is indicated by a DCI format a frequency hopping pattern from the configured set. In step 1340, the UE determines the frequency resources to transmit PUSCH repetitions based on the indicated frequency hopping pattern.

In a similar procedure to the one described in FIG. 13, a gNB (such as the BS 102) can additionally indicate a number of repetitions over which a UE (such as the UE 116) uses the indicated pattern to determine the frequencies resources.

The method 1400 as illustrated in FIG. 14 describes an example procedure for a UE to determine a frequency hopping pattern for a PUSCH transmission with repetitions according to the disclosure.

In step 1410, a UE (such as the UE 116) is configured/indicated to transmit a PUSCH with repetitions. In step 1420, the UE is configured by higher layers a set of frequency hopping patterns for transmitting the PUSCH with repetitions. In step 1430, the UE is indicated by a DCI format a frequency hopping pattern from the configured set and a number of repetitions $N_{rep\text{-}hop}$, or a number of slots $N_{slot\text{-}hop}$, for the PUSCH transmission. In step 1440, the UE determines frequency resources to transmit the PUSCH repetitions based on the indicated frequency hopping pattern.

In certain embodiment, a gNB (such as the BS 102) adapts a frequency hopping pattern. This can be done based on a need to adjust a tradeoff between improved channel estimation and increased frequency diversity in order to improve reliability for uplink transmissions, considering characteristics of the channel medium, an availability of frequency resources, and a UE capability. For example, a gNB can configure one or more sets of frequency hopping patterns, wherein one set includes patterns that provide increased frequency diversity and patterns that enable more accurate channel estimation. For example, some patterns can be beneficial for transmission by a first UE experiencing a frequency selective channel or a relatively large SINR and remaining patterns can be beneficial for transmission by a second UE experiencing a frequency non-selective channel or a small SINR.

The method 1500 as illustrated in FIG. 15 describes an example procedure for a UE to determine a frequency hopping pattern for a PUSCH transmission with repetitions according to the disclosure.

In step 1510, a UE (such as the UE 116) is configured/indicated to transmit a PUSCH with repetitions. In step 1520, the UE is configured by higher layers one or more sets of frequency hopping patterns for transmitting the PUSCH with repetitions. In step 1530, the UE is indicated by a DCI format a frequency hopping pattern from one of the configured sets. In step 1540, the UE determines the frequency resources to transmit PUSCH repetitions based on the indicated frequency hopping pattern.

Although FIG. 12 illustrates the diagram 1200, FIG. 13 illustrates the method 1300, FIG. 14 illustrates the method 1400, and FIG. 15 illustrates the method 1500 various changes may be made to FIGS. 12-15. For example, while the method 1300, the method 1400, and the method 1400 are shown as a series of steps, various steps could overlap, occur in parallel, occur in a different order, or occur multiple times. In another example, steps may be omitted or replaced by other steps. For example, steps of the method 1300, the method 1400, and the method 1500 can be executed in a different order.

Embodiments of the present disclosure further describe indicating a number of slots/repetitions for DM-RS bundling over non-consecutive slots/repetitions in time with frequency hopping. This is described in the following examples and embodiments, such as those of FIGS. 16-20.

Figure 16:
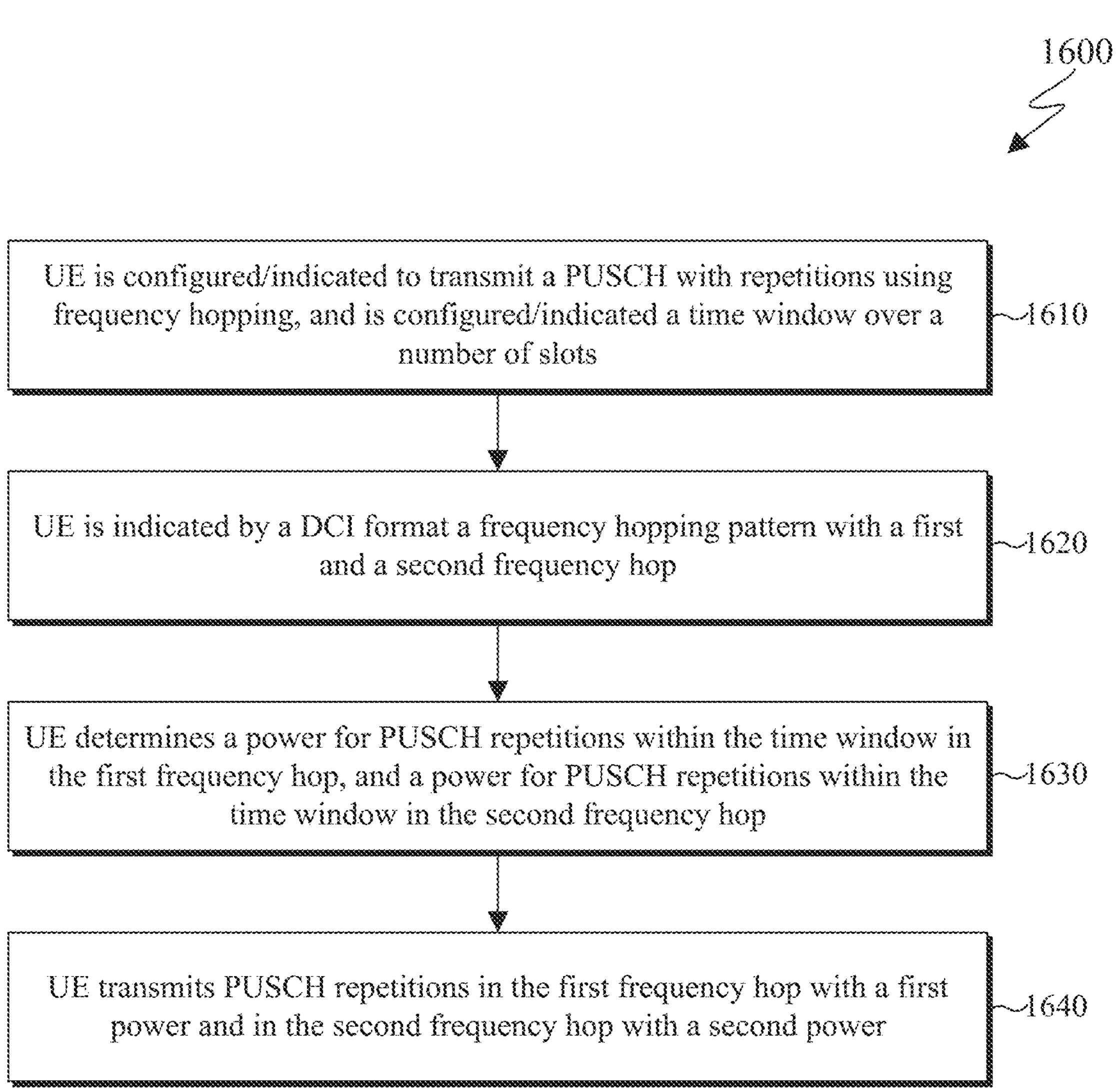
FIGS. 16 and 17 illustrate example methods for determining a transmit power for PUSCH transmission with repetitions using frequency hopping according to embodiments of the present disclosure.
Figure 17:
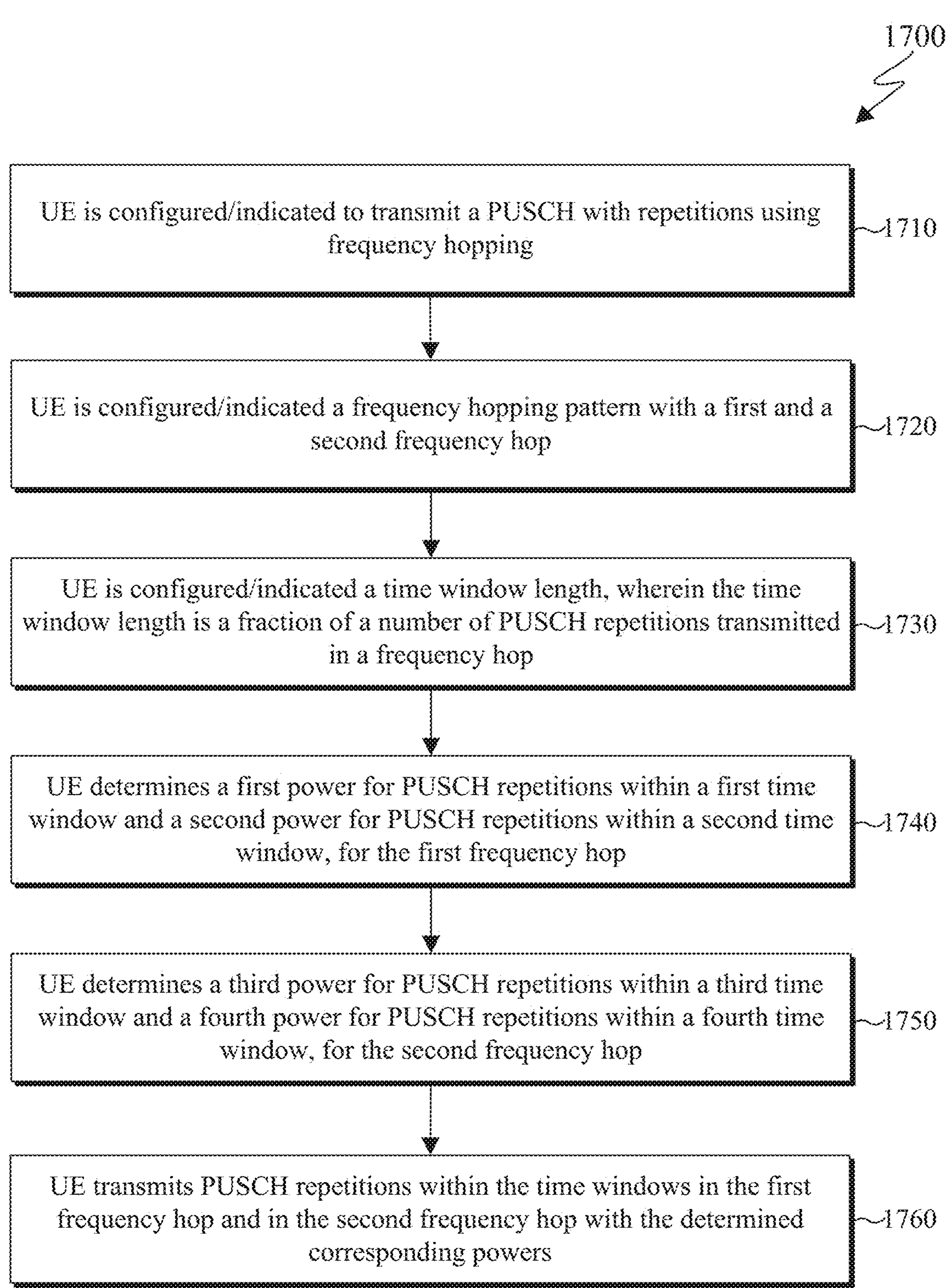
Figure 18:
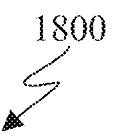
FIGS. 18 and 19 illustrate an example frequency hopping patterns configured/indicated to the UE according to embodiments of the present disclosure.
Figure 18:
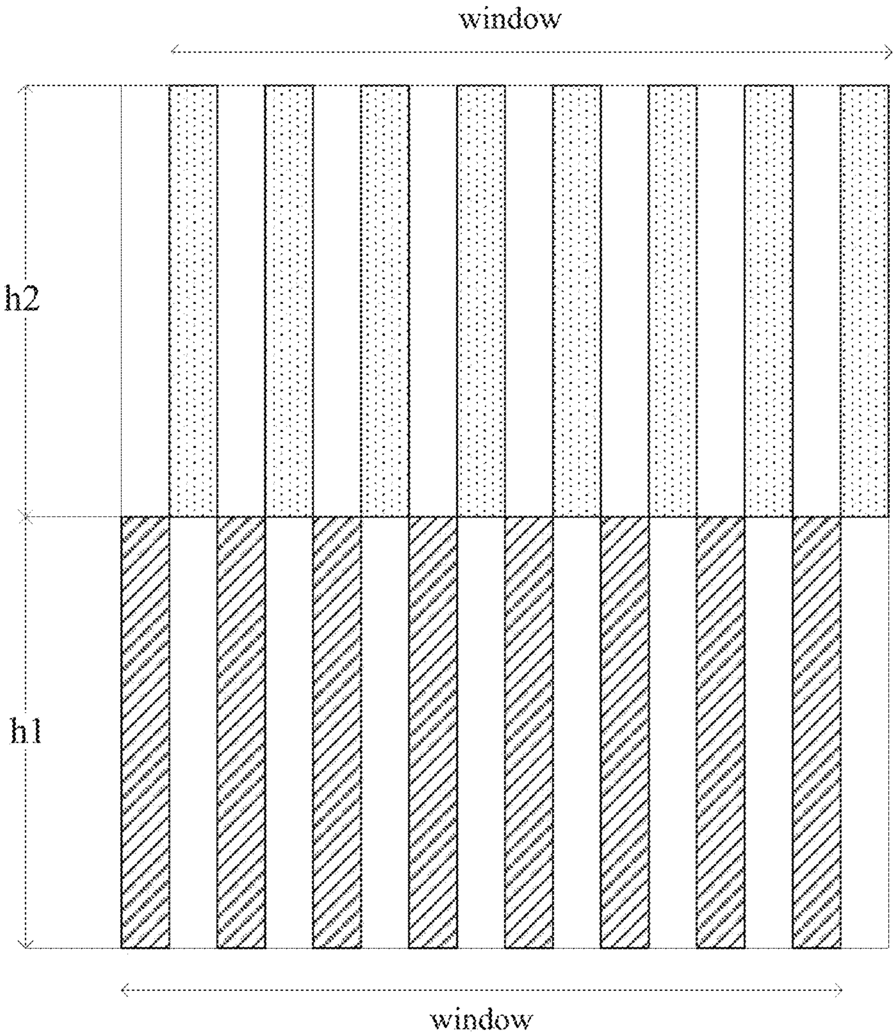
Figure 19:
Figure 19:
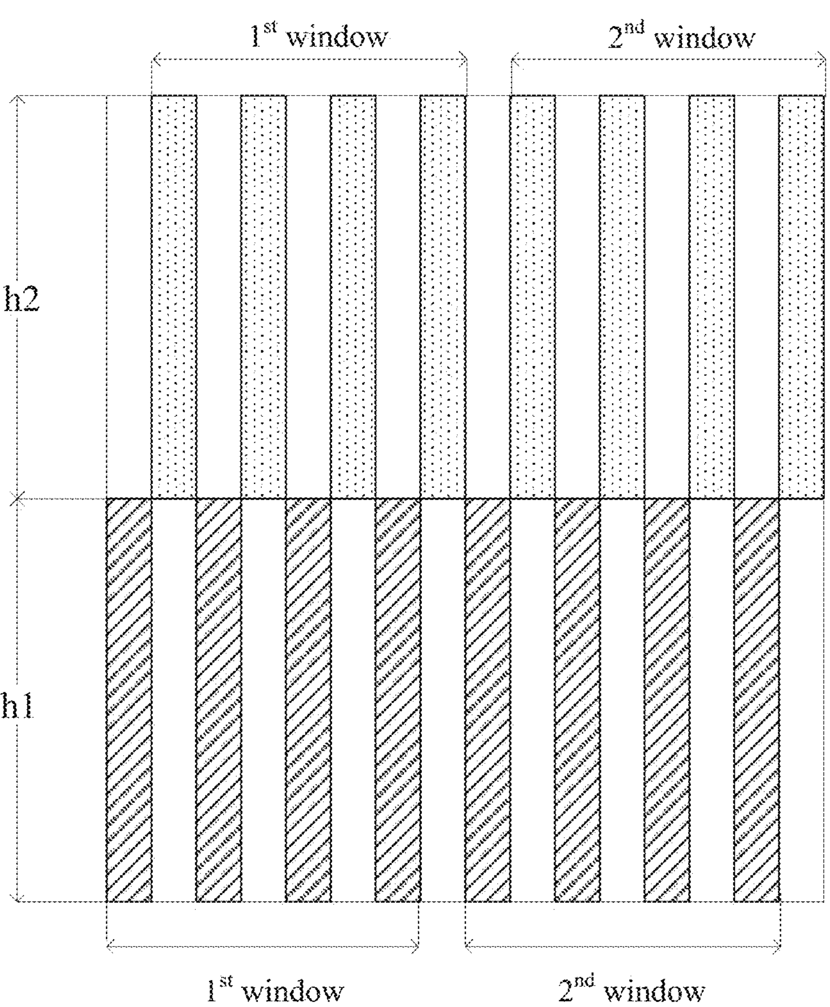
Figure 20:
FIG. 20 illustrates an example diagram of a time window according to embodiments of the present disclosure.
Figure 20:
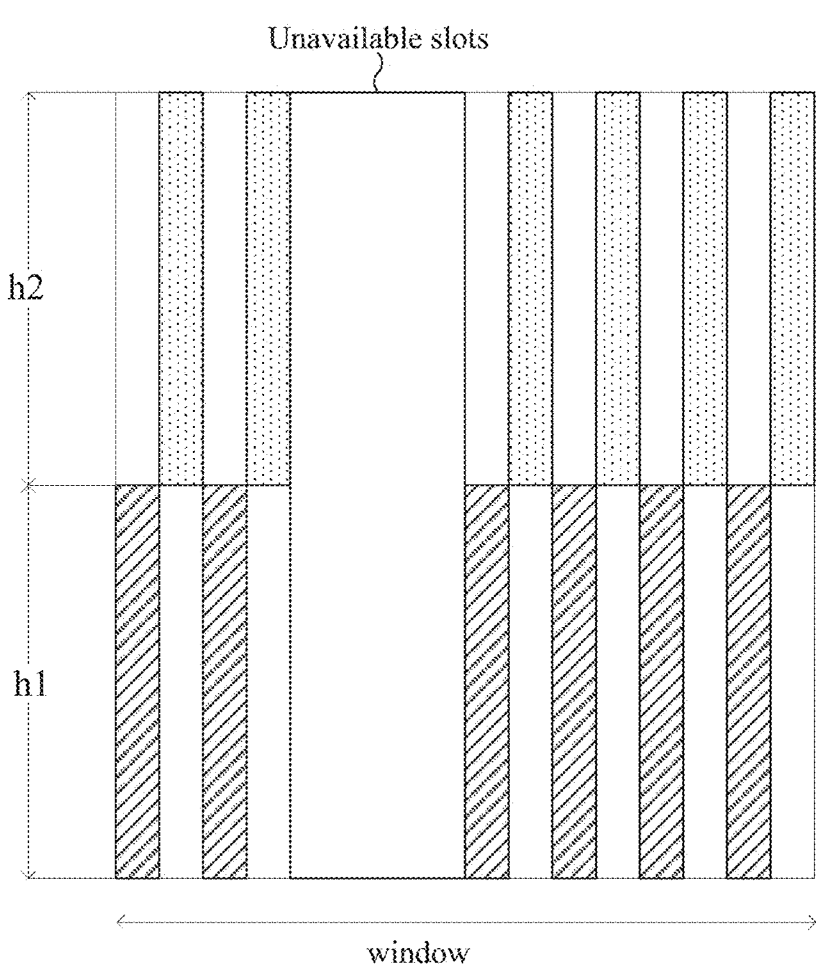

FIGS. 16 and 17 illustrate example methods 1600 and 1700, respectively, for determining a transmit power for PUSCH transmission with repetitions using frequency hopping according to embodiments of the present disclosure. FIGS. 18 and 19 illustrate diagrams 1800 and 1900, respectively, of example frequency hopping patterns configured/indicated to the UE according to embodiments of the present disclosure. FIG. 20 illustrates an example diagram 2000 of a time window according to embodiments of the present disclosure. The steps of the method 1600 of FIG. 16 and the method 1700 of FIG. 17 can be performed by any of the UEs 111-119 of FIG. 1, such as the UE 116 of FIG. 3. The methods 1600 and 1700, as well as the diagrams 1800, 1900, and 2000 are for illustration only and other embodiments can be used without departing from the scope of the present disclosure.

In certain embodiments, when a UE (such as the UE 116) is configured to transmit a PUSCH with repetitions using frequency hopping, it is possible that a configured/indicated frequency hopping pattern is such that two or more repetitions that are not consecutive in time are transmitted in same frequency resources. For example, when the UE is indicated a frequency pattern as FH #2 (as described in FIG. 12), wherein two consecutive repetitions are transmitted using frequencies resources in a first hopping interval (h1) and the next two consecutive repetitions are transmitted using frequencies resources in a second frequency hopping interval (h2), and the UE is configured/indicated to transmit a PUSCH with sixteen repetitions, a first group of repetitions comprising repetitions 1,2,5,6,9,10,13,14 are transmitted using frequency resources in h1 and a second group of repetitions comprising repetitions 3,4,7,8,11,12,15,16 are transmitted using frequency resources in h2. The UE can be also indicated a number of consecutive slots No, over which the UE is expected to transmit with constant power and phase. In this example, if the indicated number of slots $N_{w'}$ is eight, and assuming that the UE transmits one PUSCH repetition per slot, the UE transmits PUSCH repetitions of the first group with a first constant power and phase and transmits PUSCH repetitions of the second group with a second constant power and phase. The UE updates but does not apply a closed-loop power control adjustment state based on applicable TPC commands for the PUSCH transmissions within a group.

When, in the above example, the indicated number of slots $N_{w'}$ is four, and assuming that the UE transmits one PUSCH repetition per slot, the UE transmits the first four PUSCH repetitions of the first group (repetitions 1,2,5,6) with a constant power $P_{a1}$ and the next four PUSCH repetitions of the first group (repetitions 9,10,13,14) with a second constant power $P_{b1}$. For the second group of repetitions, the UE transmits the first four repetitions (repetitions 3,4,7,8) with a constant power $P_{a2}$ and the other four repetitions of the second group (repetitions 11,12,15,16) with a constant power $P_{b2}$. A same UE behavior as for the power applies for the phase of the repetitions for the PUSCH transmission. The requirements for maintaining a constant power and phase for the aforementioned groups of repetitions are subject to certain conditions, such as the UE not having other simultaneous transmissions during some of the repetitions of a group in a same frequency band or the UE not suspending a repetition due to prioritization of another transmission, and so on. During the transmission of a group of repetitions the UE skips an application of TPC commands and does not update a closed-loop power control adjustment state but accumulates TPC commands, updates a corresponding closed-loop power control adjustment state and applies a latest updated value to determine a power for repetitions of the PUSCH transmission when the window changes. For example, a UE transmits repetitions 1,2,5,6 with same transmit power $P_{a1}$ and transmits repetitions 9,10,13,14 with a different power $P_{b1}$, wherein the power $P_{b1}$ is calculated by applying the closed-loop power control adjustment state that is updated using TPC commands accumulated during the transmission of repetitions 1,2,5,6.

The method 1600 as illustrated in FIG. 16 describes an example procedure for a UE to determine a transmit power for a PUSCH transmission with repetitions using frequency hopping according to the disclosure.

In step 1610, a UE (such as the UE 116) is configured/indicated to transmit a PUSCH with repetitions using frequency hopping. The UE is also configured/indicated a time window over a number of slots. In step 1620, the UE is indicated by a DCI format a frequency hopping pattern with a first and a second frequency hop. In step 1630, the UE determines a power for PUSCH repetitions within the time window in the first frequency hop, and a power for PUSCH repetitions within the time window in the second frequency hop. In step 1640, the UE transmits PUSCH repetitions in the first frequency hop with a first power and in the second frequency hop with a second power.

The method 1700 as illustrated in FIG. 17 describes an example procedure for a UE to determine a transmit power for a PUSCH transmission with repetitions using frequency hopping according to the disclosure. FIGS. 18 and 19 illustrate example diagrams 1800 and 1900 of example frequency hopping patterns configured/indicated to the UE.

In step 1710, a UE (such as the UE 116) is configured/indicated to transmit a PUSCH with repetitions using frequency hopping. In step 1720, the UE is configured/indicated a frequency hopping pattern with a first and a second frequency hop. In step 1730, the UE is configured/indicated a time window length, wherein the time window length is a fraction of a number of PUSCH repetitions transmitted in a frequency hop. In step 1740, the UE determines a first power for PUSCH repetitions within a first time window and a second power for PUSCH repetitions within a second time window, for the first frequency hop. In step 1750, the UE determines a third power for PUSCH repetitions within a third time window and a fourth power for PUSCH repetitions within a fourth time window, for the second frequency hop. In step 1760, the UE transmits PUSCH repetitions within the time windows in the first frequency hop and in the second frequency hop with the determined corresponding powers.

In certain embodiments, when a gNB (such as the BS 102) configures/indicates to a UE (such as the UE 116) to transmit a PUSCH with repetitions using frequency hopping, and configures/indicates a time window for the UE to apply conditions that result to a same phase and a same power for the repetitions over the window, the gNB can configure/indicate the time window as a number of slots, or a number of repetitions, or a number of symbols. Here the slots are consecutive slots or, generally, slots available for PUSCH transmission. When the window is defined by a number of consecutive slots, a slot can include one or more repetitions and/or one or more fractions of a repetition, or no repetition (no PUSCH transmission). When the window is defined by available slots, a slot can include one or more PUSCH repetitions and/or one or more fractions of a repetition.

The diagram 2000 as illustrated in FIG. 20 describes a time window indicated as sixteen consecutive slots and, assuming transmission of a PUSCH repetition per slot, the time window includes six PUSCH repetitions per frequency hopping interval due to an unavailability of four slots for PUSCH repetitions.

Although FIG. 16 illustrates the method 1600, the FIG. 17 illustrates the method 1700, the FIG. 18 illustrates the diagram 1800, the FIG. 1900 illustrates the diagram 1900, and the FIG. 20 illustrates the diagram 2000 various changes may be made to FIGS. 16-20. For example, while the method 1600 and the method 1700 are shown as a series of steps, various steps could overlap, occur in parallel, occur in a different order, or occur multiple times. In another example, steps may be omitted or replaced by other steps. For example, steps of the method 1600 and the method 1700 can be executed in a different order.

Embodiments of the present disclosure also describe determining a PUSCH or PUCCH transmission power over a number of slots/repetitions for DM-RS bundling over non-consecutive slots/repetitions in time.

In certain embodiments, when a UE (such as the UE 116) is configured to transmit a PUSCH with repetitions, it is possible that repetitions occur in non-consecutive slots (such as due to unavailability of consecutive slots). A gap between two consecutive repetitions can be one or more slots. In order to satisfy the requirements of constant power and phase continuity for repetitions within a window, the UE derives a power value for repetitions within the window by considering the gaps between repetitions in the window. For a number of repetitions in a first window, the UE skips an application of TPC commands and does not update a closed-loop power control adjustment state. However, the UE accumulates TPC commands and updates a corresponding closed-loop power control adjustment state for each slot regardless of a PUSCH transmission occurs in the slot. When there is a slot with no transmission, an update of the closed-loop power control adjustment state can be done as if a "virtual" TPC command is received and is same as the last TPC command received in a previous slot. When the transmission gap includes more than one slot, a single or multiple "virtual" TPC commands can be assumed. From the latest updated closed-loop power control adjustment state for a window, the UE determines a corresponding power for repetitions of the PUSCH transmission when the window changes. Alternatively or additionally, a UE can determine a power for repetitions of the PUSCH transmission when the window changes by scaling a power value determined from a closed-loop power control adjustment state.

Embodiments of the present disclosure also describe inter-slot frequency hopping for uplink transmissions. This is described in the following examples and embodiments, such as those of FIGS. 21-24.

Figure 21:
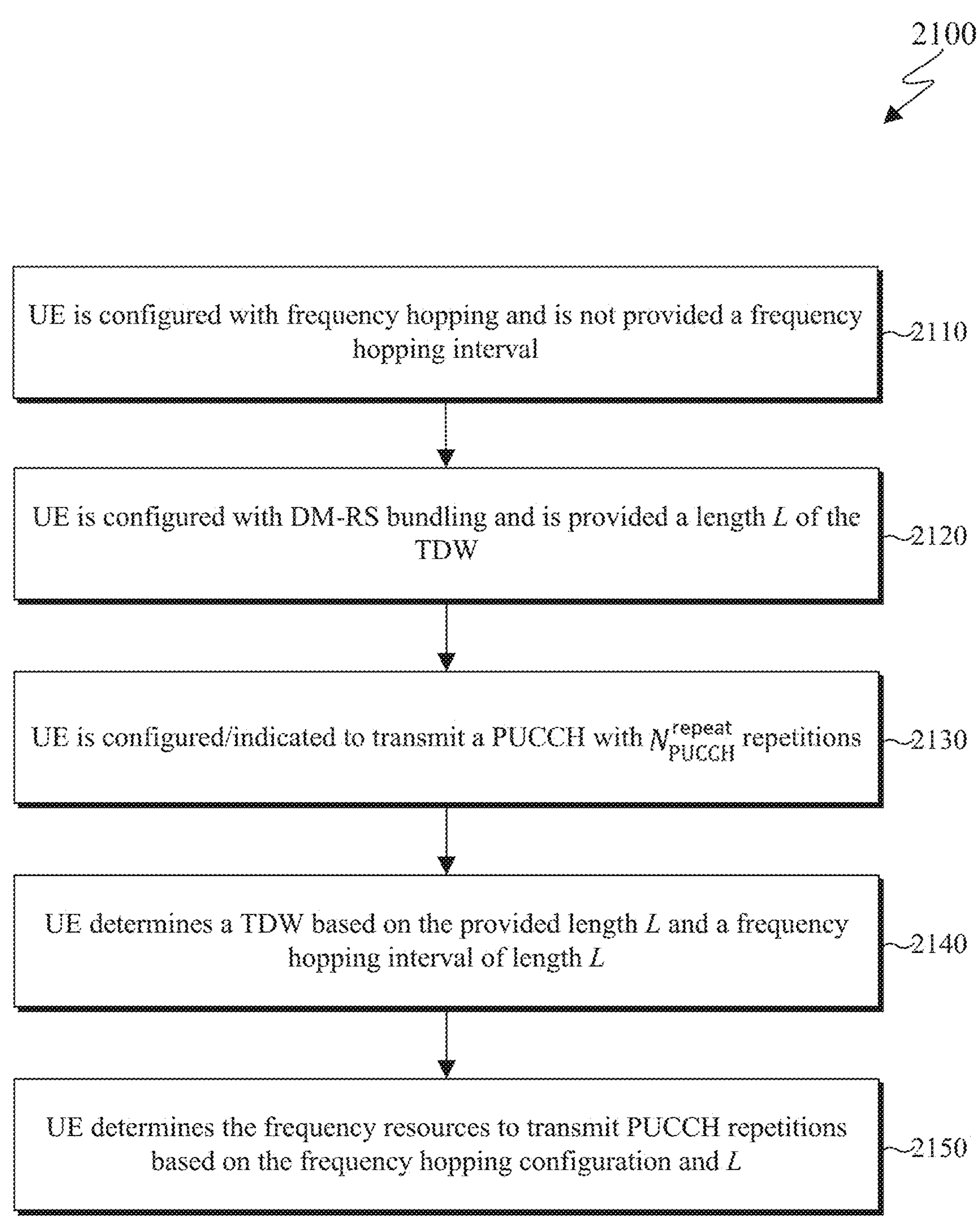
FIGS. 21 and 22 illustrate example methods for determining the frequency resources to transit physical uplink control channel (PUCCH) repetitions according to embodiments of the present disclosure.
Figure 22:
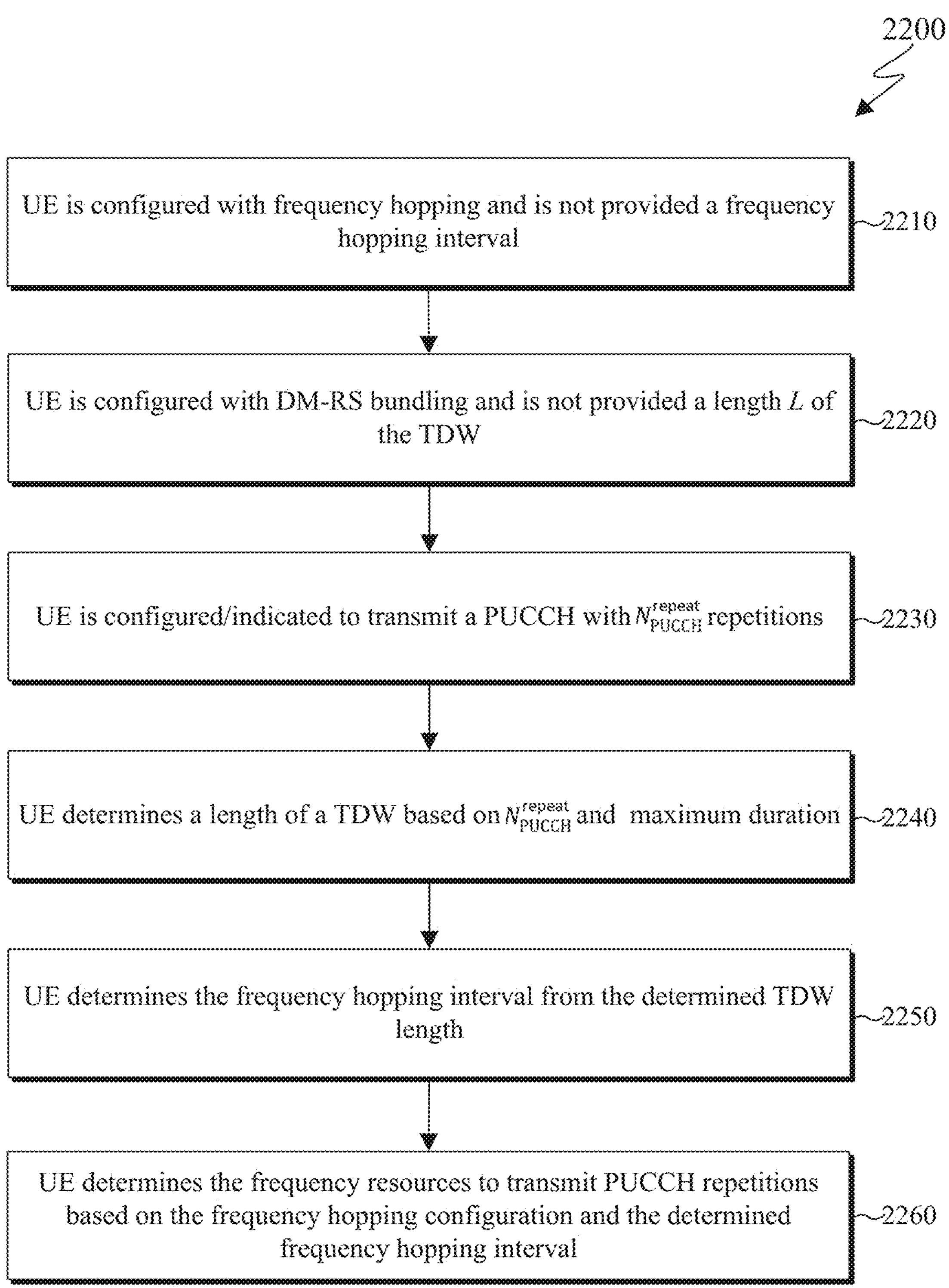
Figure 23:
FIG. 23 illustrates an example diagram of a UE configured with PUCCH-DM-RS bundling enabled and configured to perform frequency hopping for PUCCH transmissions according to embodiments of the present disclosure.
Figure 23:
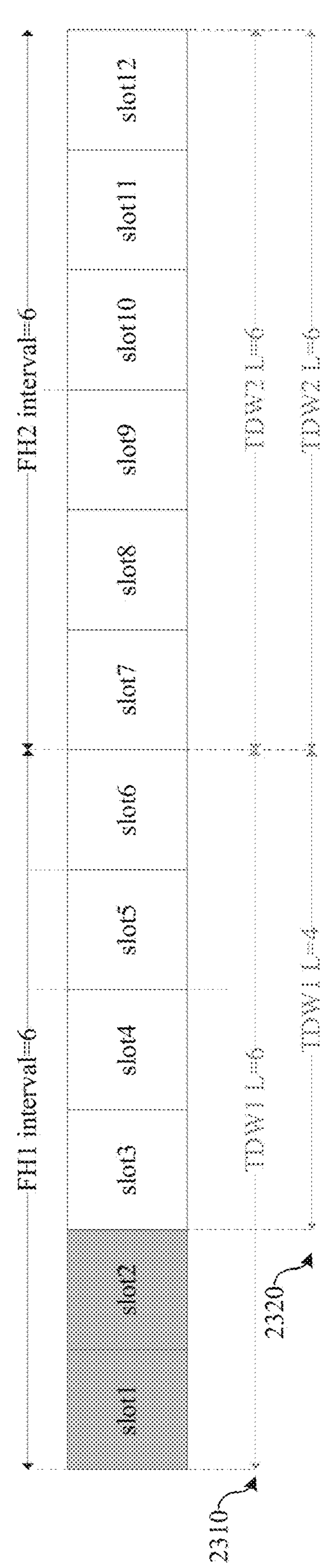
Figure 24:
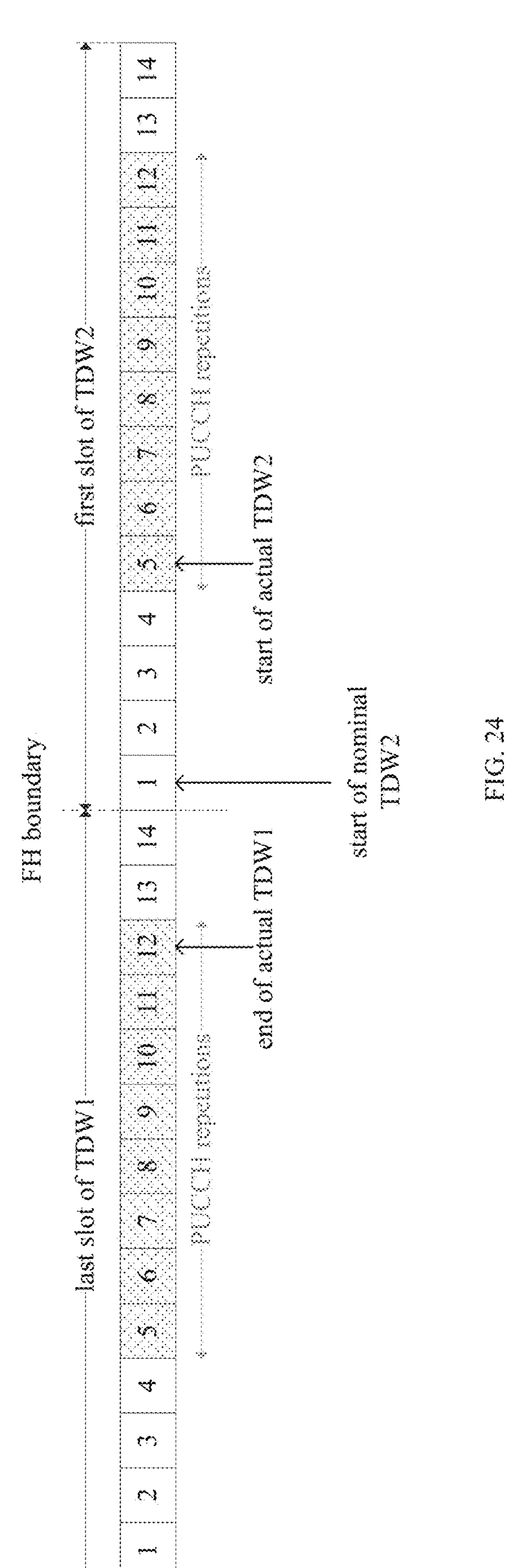
FIG. 24 illustrates an example a diagram of a last slot of a first frequency hope and the first slot of a second frequency hope according to embodiments of the present disclosure.

FIGS. 21 and 22 illustrate example methods 2100 and 2200, respectively, for determining the frequency resources to transit PUCCH repetitions according to embodiments of the present disclosure. FIG. 23 illustrates an example diagram 2300 of a UE configured with PUCCH-DM-RS bundling enabled and configured to perform frequency hopping for PUCCH transmissions according to embodiments of the present disclosure. FIG. 24 illustrates an example a diagram 2400 of a last slot of a first frequency hop and the first slot of a second frequency hop according to embodiments of the present disclosure. The steps of the method 2100 of FIG. 21 and the method 2200 of FIG. 22 can be performed by any of the UEs 111-119 of FIG. 1, such as the UE 116 of FIG. 3. The methods 2100 and 2200 as well as the diagrams 2300 and 2400 are for illustration only and other embodiments can be used without departing from the scope of the present disclosure.

In certain embodiments, when a UE (such as the UE 116) is configured with DM-RS bundling and is also configured with frequency hopping, there is a need to adapt a time domain window for DM-RS bundling to a frequency hopping configuration to enhance a reception reliability for the PUSCH or PUCCH, improve a tradeoff between DM-RS bundling and frequency hopping, and enhance scheduling flexibility of frequency resources. There is also a need to adapt a frequency hopping for a PUSCH or PUCCH transmission with repetitions.

It is noted that for brevity reference is to a PUCCH transmission with repetitions, similar principles can apply to (i) a PUSCH transmission with repetitions, (ii) a transmission of a TB over multiple slots, (iii) a transmission of a TB over multiple slots with TB repetitions, or (iv) a transmission of different TBs over a number of slots.

In certain embodiments, a UE (such as the UE 116) configured with frequency hopping may or may not be configured with a frequency hopping interval. If the frequency hopping interval is not configured, the value of the frequency hopping interval can depend on a configuration for DMRS bundling or on a configuration or indication of a number of repetitions. When the UE is configured with frequency hopping interval, the same configuration may apply for operation in an UL BWP.

In certain embodiments, when a UE (such as the UE 116) is indicated to transmit a PUCCH over $$N_{PUCCH}^{repeat}$$

slots and $$N_{PUCCH}^{repeat} > 1,$$

is configured by interslotFrequencyHopping to perform frequency hopping for PUCCH transmissions in different slots, and is configured by PUCCH-FrequencyHopping-Interval the value $$N_{PUCCH}^{interval}$$

of the frequency hopping interval, the UE repeats the PUCCH transmission over $$N_{PUCCH}^{repeat}$$

slots and performs frequency hopping per $$N_{PUCCH}^{interval}.$$

The UE can be provided with $$N_{PUCCH}^{interval}$$

parameter that the UE uses to transmit with any PUCCH format and/or with any PUCCH resource. It is also possible that the PUCCH-Frequencyhopping-Interval configuration provides $$N_{PUCCH}^{interval}$$

parameter values per PUCCH format or per PUCCH resource.

In certain embodiments, when a UE (such as the UE 116) is configured to perform frequency hopping for PUCCH transmissions and is also configured with DM-RS bundling with a length L of the time domain window for DM-RS bundling, the time interval over which the UE performs DM-RS bundling can depend on the configuration of DM-RS bundling and/or the configuration of frequency hopping pattern or interval and/or a default value. For example, the gNB can configure a frequency hopping interval or a number of frequency hops or both. A default frequency hopping interval or a default number of frequency hops can be defined for the UE to use when the configuration is not provided. The default value of the frequency hopping interval or of the number of hops can be fixed or can be calculated based on other higher layer parameter values and/or based on an indication in a DCI format and/or based on a UE capability information. In one example, a UE is provided a frequency hopping interval configuration and when the UE receives an indication for transmission with frequency hopping, the UE transmits with the configured frequency hopping interval. In another example, the UE is not provided a frequency hopping interval configuration and when the UE receives an indication for transmission with frequency hopping, the UE transmits with the default frequency hopping interval.

In certain embodiments, when a UE (such as the UE 116) is configured to perform frequency hopping for PUCCH transmissions and is provided a frequency hopping interval N, and is configured with DM-RS bundling and is not provided a time domain window (TDW) length, the length of the nominal or configured TDW is assumed same as the frequency hopping interval. UE performs DM-RS bundling over the slots of a first frequency hop and when the frequency hop changes the TDW changes and the UE restarts DM-RS bundling over a second TDW of length equal to a second frequency hop interval. A UE can be configured or indicated a pattern over a number of slots or symbols, and the duration of frequency hops in a pattern can be same or different.

In certain embodiments, when a UE (such as the UE 116) is configured to perform frequency hopping for PUCCH transmissions and is provided a frequency hopping interval N, and is configured with DM-RS bundling and is provided a TDW length L by higher layers, the length of the TDW over which the UE transmits PUCCH repetitions maintaining phase and power continuity may depend on one or both of the value L of the configured TDW length and the value N of the configured frequency hop interval, wherein the value L and the value N are provided as a number of slots or symbols.

For a frequency hopping interval N, where N indicates a number of consecutive slots, if L is smaller than N, then PUCCH repetitions within the time interval L are part of a first TDW, and the remaining repetitions within the same frequency hop can be part of one or more TDWs of length L or less, wherein the length of the last TDW within the frequency hop can be less than L. Similarly, for a frequency hopping interval N, where N indicates a number of consecutive slots, if L is larger or equal to N, then PUCCH repetitions within the time interval N are part of a first TDW, and the remaining repetitions can be part of one or more TDWs of length N or less, wherein the length of the last TDW can be less than N.

In certain embodiments, when a UE (such as the UE 116) is configured with frequency hopping for PUCCH transmissions and is not provided a frequency hopping interval N by higher layers, and is configured with DM-RS bundling and is provided a TDW length L by higher layers, the value of the frequency hopping interval is assumed to be equal to the configured value L.

In certain embodiments, when a UE (such as the UE 116) is configured with frequency hopping for PUCCH transmissions and is not provided a frequency hopping interval N by higher layers, and is configured with DM-RS bundling and is not provided a TDW length L by higher layers, the value of the frequency hopping interval can be a default value of the frequency hopping interval or a default value of the TDW length or derived from the number of slots $$N_{PUCCH}^{repeat}$$

over which the UE is indicated to transmit the PUCCH.

The value range of configured parameters N and L can be same or different. A frequency hopping interval N can assume values from a first value set $\{n_1, n_2, n_{N_{MAX}}\}$ and a configured TDW length L can assume values from a second value set $\{l_1, l_2, \ldots, l_{L_{MAX}}\}$. It is noted that $N_{MAX}$ and $L_{MAX}$ can be same or different and a value from the first set may or may not be part of the second set, and vice versa a value from the second set may or may not be part of the first set. In a first example, the first value set for frequency hopping interval is {1,2,4} and the second value set for TDW length is {2,4,8}. In a second example, the first value set for frequency hopping interval is {1,2,4,8,16} and the second value set for TDW length is {2,4,8,16,32}. In a third example, the first value set for frequency hopping interval is {1,2,4,8,16} and the second value set for TDW length is {2,4,8,16,20,32,48}. A set of values for a configuration of a TDW length can be same as a set of number of repetitions or additionally include one or more larger values than the maximum number of repetitions. A TDW length that is larger than the maximum number of repetitions can be used when some of the slots cannot be used for transmission. For example, if the number of PUSCH repetitions is 16 and there are not 16 consecutive available slots, the TDW length can be equal to 20 slots wherein 4 of the 20 slots are not available for PUSCH transmission and DMRS bundling can be used for the 16 non-consecutive slots. It is also possible that the granularity of values for the TDW length is different than the granularity of number of repetitions. For example, the set of values for the TDW length is a subset of the values of number of repetitions.

It is noted that descriptions using the set of values for a TDW length configuration equally apply when the set of number of repetitions is used instead of the set of values of TDW length.

In certain embodiments, when the frequency hopping interval is not configured and the TDW length is configured with a first value that is the maximum value of the second set which is not included in the first set or is a value of the second set larger than the maximum value of the first set, the frequency hopping interval can be half of the first value if that value is included in the first set, or the value in the second set that is the next larger value of half of the first value of the second set, or the maximum value of the first set.

In certain embodiments, when the frequency hopping interval is not configured and the TDW length is configured with a first value of the second set that is not included in the first set or half of the first value is not included in the first set, the frequency hopping interval can be the value of the first set that is the next larger value than the first value or larger than half of the first value.

In one embodiment, when a UE (such as the UE 116) is indicated to transmit a PUCCH over $$N_{PUCCH}^{repeat}$$

slots and $$N_{PUCCH}^{repeat} > 1,$$

if the UE is configured to perform frequency hopping for repetitions of a PUCCH transmission across different slots and the UE is not provided with PUCCH-DMRS-Bundling='enabled,' then the following examples can occur. In one example, the UE repeats the PUCCH transmission over $$N_{PUCCH}^{repeat}$$

slots performs frequency hopping per interval of $$N_{PUCCH}^{interval}$$

consecutive slots, that starts from the first slot where the UE would transmit a repetition of the PUCCH transmission, where $$N_{PUCCH}^{interval}$$

is the value of PUCCH-FrequencyHopping-Interval, if provided; otherwise, $$N_{PUCCH}^{interval} = N_{PUCCH}^{repeat}/2.$$

In another example, the UE transmits the PUCCH over $$N_{PUCCH}^{repeat}/N_{PUCCH}^{interval}$$

intervals. The first interval has number 0 and each subsequent interval, until the UE transmits the PUCCH in $$N_{PUCCH}^{repeat}$$

slots, is counted regardless of whether or not the UE transmits the PUCCH in a slot. In yet another example, the UE transmits the PUCCH starting from a PRB, provided by startingPRB, in intervals with even number and starting from a PRB, provided by secondHopPRB, in intervals of frequency hopping intervals with odd number.

In another embodiment, when a UE (such as the UE 116) is indicated to transmit a PUCCH over $$N_{PUCCH}^{repeat} \text{ slots and } N_{PUCCH}^{repeat} > 1,$$

if the UE is configured to perform frequency hopping for repetitions of a PUCCH transmission across different slots, is provided PUCCH-DMRS-Bundling='enabled' and is not provided PUCCH-TimeDomainWindowLength, then the following examples can occur. In one example, the UE repeats the PUCCH transmission over $$N_{PUCCH}^{repeat}$$

slots performs frequency hopping per interval of $$N_{PUCCH}^{interval}$$

consecutive slots, that starts from the first slot where the UE would transmit a repetition of the PUCCH transmission, where $$N_{PUCCH}^{interval}$$

is the value of PUCCH-FrequencyHopping-Interval, if provided; otherwise, $$N_{PUCCH}^{interval} = N_{PUCCH}^{repeat}/2.$$

In another example, the UE transmits the PUCCH over $$N_{PUCCH}^{repeat}/N_{PUCCH}^{interval}$$

intervals. The first interval has number 0 and each subsequent interval, until the UE transmits the PUCCH in $$N_{PUCCH}^{repeat}$$

slots, is counted regardless of whether or not the UE transmits the PUCCH in a slot. In yet another example, the UE transmits the PUCCH starting from a PRB, provided by startingPRB, in intervals with even number and starting from a PRB, provided by secondHopPRB, in intervals of frequency hopping intervals with odd number.

In yet another embodiment, when a UE is indicated to transmit a PUCCH over $$N_{PUCCH}^{repeat} \text{ slots and } N_{PUCCH}^{repeat} > 1,$$

if the UE is configured to perform frequency hopping for repetitions of a PUCCH transmission across different slots, is provided PUCCH-DMRS-Bundling='enabled' and is provided PUCCH-TimeDomainWindowLength='L', then the following examples can occur. In one example, the UE repeats the PUCCH transmission over $$N_{PUCCH}^{repeat}$$

slots performs frequency hopping per interval of $$N_{PUCCH}^{interval}$$

consecutive slots, that starts from the first slot where the UE would transmit a repetition of the PUCCH transmission, where $$N_{PUCCH}^{interval}$$

is the value of PUCCH-FrequencyHopping-Interval, if provided; otherwise, $$N_{PUCCH}^{interval} = L/2.$$

In another example, the UE transmits the PUCCH over $$N_{PUCCH}^{repeat}/N_{PUCCH}^{interval}$$

intervals. The first interval has number 0 and each subsequent interval, until the UE transmits the PUCCH in $$N_{PUCCH}^{repeat}$$

slots, is counted regardless of whether or not the UE transmits the PUCCH in a slot. In yet another example, the UE transmits the PUCCH starting from a PRB, provided by startingPRB, in intervals with even number and starting from a PRB, provided by secondHopPRB, in intervals of frequency hopping intervals with odd number.

Alternatively to $$N_{PUCCH}^{interval} = L/2,$$

the value of $$N_{PUCCH}^{interval}$$

can be $$N_{PUCCH}^{interval} = L,$$

or $$N_{PUCCH}^{interval} = \min(F, L), \text{ or } N_{PUCCH}^{interval} = \min(F, L/2).$$

Here the value F can be a value configured by the network or indicated by the UE. The value F can be estimated based on measurements of a received signal by the UE or can be a fixed value.

In certain embodiments, when a UE (such as the UE 116) is configured to perform frequency hopping for PUCCH transmissions, the UE can be provided more than one frequency hopping interval. For example, when the UE is provided with 2 frequency hopping intervals No and $N_1$, the UE performs frequency hopping per interval and transmits the PUCCH starting from a first PRB, provided by startingPRB, over a number of slots equal to a first frequency hopping interval $N_0$ and starting from the second PRB, provided by secondHopPRB, over a number of slots equal to a second frequency hopping interval $N_1$. The first slot of the first frequency hopping interval is the slot indicated to the UE for the first PUCCH transmission and has number 0 and each subsequent slot until the UE transmits the PUCCH in $$N_{PUCCH}^{repeat}$$

slots is counted regardless of whether or not the UE transmits the PUCCH in the slot. Slots in a frequency hopping interval are consecutive slots and the last slot of a frequency hopping interval and the first slot of a subsequent frequency hopping interval are consecutive slots. When the UE is configured with DM-RS bundling and is not provided a TDW length, the TDW length is determined as the same length as the frequency hopping interval, and may change per frequency hop. It is also possible that the UE is provided with more than two starting PRBs, for example the UE can be provided with thirdHopPRB which is the index of first PRB for a PUCCH transmission in the third frequency hop.

In certain embodiments, when a UE (such as the UE 116) is configured to perform frequency hopping for PUCCH transmissions and is not provided a frequency hopping pattern or interval, and is configured with DM-RS bundling and is provided a TDW length L by higher layers, the TDW is determined based on the configured value L and the frequency hopping interval is determined equal to L. Thus, the UE performs frequency hopping per interval of L slots and transmits the PUCCH starting from a first PRB, provided by startingPRB, in slots of a frequency hopping interval and starting from the second PRB, provided by secondHopPRB, in slots of a frequency hopping interval. The first slot of the first frequency hopping interval is the slot indicated to the UE for the first PUCCH transmission and has number 0 and each subsequent slot until the UE transmits the $$N_{PUCCH}^{repeat}$$

PUCCH in slots is counted regardless of whether or not the UE transmits the PUCCH in the slot. The slots in a frequency hopping interval are consecutive slots and the last slot of a frequency hopping interval and the first slot of a subsequent frequency hopping interval are consecutive slots.

The method 2100 as illustrated in FIG. 21 describes example procedure for a UE to determine the frequency resources to transmit PUCCH repetitions according to the disclosure.

In step 2110, a UE (such as the UE 116) is configured with frequency hopping and is not provided a frequency hopping interval. In step 2120, the UE is configured with DM-RS bundling and is provided a length L of the TDW. In step 2130, the UE is configured/indicated to transmit a PUCCH with $$N_{PUCCH}^{repeat}$$

repetitions. In step 2140, the UE determines a TDW based on the provided length L and a frequency hopping interval of length L. In step 2150, the UE determines the frequency resources to transmit PUCCH repetitions based on the frequency hopping configuration and L.

In certain embodiments, when a UE (such as the UE 116) is configured to perform frequency hopping for PUCCH transmissions and is not provided a frequency hopping interval, and is configured with DM-RS bundling and is not provided a length L of the TDW by higher layers, the TDW length can be determined by the maximum duration defined by PUCCH-TimeDomainWindowLength. The maximum duration is a UE capability that indicates the maximum time interval over which the UE can maintain power consistency and phase continuity across PUCCH transmissions of PUCCH repetitions. It is possible that the TDW length is determined by the number of PUCCH repetition $$N_{PUCCH}^{repeat}.$$

It is also possible that the TDW length is determined as the minimum value between the maximum duration and the number of repetitions. Then the frequency hop interval can be determined to be same as the determined TDW length. Frequency hopping interval and TDW length can also have different values. For example, the frequency hopping interval can be same as the number of repetitions and the TDW length can be same as the maximum duration. This can be beneficial under certain channel conditions and when the difference between maximum duration and number of repetitions increases.

The method 2200 as illustrated in FIG. 22 describes an example procedure for a UE to determine the frequency resources to transmit PUCCH repetitions according to the disclosure.

In step 2210, a UE (such as the UE 116) is configured with frequency hopping and is not provided a frequency hopping interval. In step 2220, the UE is configured with DM-RS bundling and is provided a length L of the TDW. In step 2230, the UE is configured/indicated to transmit a PUCCH with $$N_{PUCCH}^{repeat}$$

repetitions. In step 2240, the UE determines a length of a TDW based on $$N_{PUCCH}^{repeat}$$

and maximum duration. In step 2250, the UE determines the frequency hopping interval from the determined TDW length. In step 2260, the UE determines the frequency resources to transmit PUCCH repetitions based on the frequency hopping configuration and the determined frequency hopping interval.

FIG. 23 illustrates the diagram 2300 of a UE configured with PUCCH-DM-RS-Bundling enabled and configured to perform frequency hopping for PUCCH transmissions of six PUCCH repetitions with a frequency hopping interval of six slots. The first two slots are not available for PUCCH transmission. In case 2310 a TDW is determined by the indices of the consecutive slots in a first frequency hopping interval, and a first TDW length is same as a first frequency hopping interval. In case 2320 the TDW is determined by the indices of available slots, and since the first two slots are not available for PUCCH transmission, the first TDW starts in slot three and has length equal to four slots. In both the case 2310 and the case 2320, the UE maintains power consistency and phase continuity across PUCCH repetitions transmitted in slots three to six. The UE applies DM-RS bundling in a second TDW and maintains power consistency and phase continuity across PUCCH repetitions transmitted in slots seven to twelve.

The determination of the first TDW as in case 2310 or in case 2320 can depend on whether the TDW length is determined from PUCCH-TimeDomainWindowLength, if present. Here PUCCH-TimeDomainWindowLength defines the duration of each nominal TDW in number of slots determined for PUCCH transmission, or from a value of a frequency hopping interval, or from a number of PUCCH repetition $$N_{PUCCH}^{repeat},$$

or from a UE capability that includes a maximum number of slots over which the UE can maintain power consistency and phase continuity across PUCCH transmissions.

It is also possible that in case 2320 whether TDW1 is a nominal or an actual TDW depends on the unavailable slots for PUCCH transmission. For operation in unpaired spectrum when a UE is scheduled to transmit PUCCH repetitions over a number of slots and some of the slots become unavailable (for example due to overlap with other UL transmissions with higher priority, UL cancellation indication, DL reception, SFI reception, or the like) whether the TDW is a nominal or actual TDW depends on the type of mechanism that causes unavailability of the dynamically indicated or semi-statically configured scheduled time and frequency resources. For example, whether the unavailability of resources is caused by a dynamic signaling, such as an indication in a DCI format, or by an overlap with a DL symbol indicated by an RRC configuration, such as tdd-UL-DL-ConfigurationCommon or tdd-UL-DL-Configuration-Dedicated if provided, or ssb-PositionInBurst, determines a TDW as a nominal or an actual TDW.

For an actual TDW for PUCCH transmissions, as for example for TDW1 of case 2320, the start of the actual TDW1 is the first symbol of the first PUCCH transmission in a slot determined for PUCCH transmission within the nominal TDW that spans the frequency hopping interval of six slots, and the end of the actual TDW1 is the last symbol of the last PUCCH transmission in a slot determined for PUCCH transmission within the nominal TDW, if the actual TDW reaches the end of the last PUCCH transmission within the nominal TDW.

FIG. 24 illustrates the diagram 2400 of a last slot of a first frequency hop and the first slot of a second frequency hop. In each slot there are two PUCCH repetitions of four symbols that are transmitted back-to-back. A first actual TDW ends before a frequency hopping boundary and a second TDW starts after the frequency hopping boundary. If the second TDW is a nominal TDW, the start of the second nominal TDW is the first symbol of the slot after the frequency hopping boundary that include the first PUCCH transmission after the frequency hopping boundary. If the second TDW is a nominal TDW, the start of the second actual TDW is the first symbol of the first PUCCH transmission after the frequency hopping boundary.

When a UE (such as the UE 116) is configured to perform frequency hopping for PUCCH transmissions, a frequency hopping interval can be provided per UL BWP in a PUCCH configuration PUCCH-Config, or can be provided per PUCCH resource in a PUCCH resource configuration PUCCH-Resource. It is possible that one or more time frequency intervals are provided, wherein the one value is used for all frequency hops or one of the provided values is used for multiple hops. It is also possible that the frequency hopping interval is used on a first frequency hop for a first number of times and then used for a second frequency hop for a second number of times.

For example, when a UE is configured to perform frequency hopping for PUCCH transmissions and is not provided a frequency hopping interval, the frequency hopping interval can be provided by a DCI. Here the DCI format can be a scheduling DCI that schedules the PUCCH transmission or an activation DCI or a DCI including a field that indicates one or more values of the frequency hopping interval. It is also possible that the indication of one or more of the frequency hopping interval is by MAC control element (CE).

A gNB (such as the BS 102) can configure a UE with one or more values of the frequency hopping interval, and use physical layer signaling to dynamically indicate the number of frequency hopping intervals or to change a value of a frequency hopping interval. For example, a gNB can indicate the UE behavior by a 1-bit field in the DCI format scheduling PUCCH. A 1-bit field signaling can be used to indicate whether to change frequency hopping interval. For example, a value of "0" indicates no change, and a value of "1" indicates that a configured value of the frequency hopping interval can be used. It is also possible that the 1-bit DCI field indicates whether to use a first frequency hopping interval or a second frequency hopping interval. A gNB can also configure multiple values for the number of frequency hopping intervals, and use a field in DCI to indicate which value to use. For example, the gNB can configure by higher layers 4 values for the frequency hopping interval that the UE can use to transmit symbols for repetitions of the PUCCH transmissions, and indicate which value to use with a 2-bit field in DCI format.

In certain embodiments, when a UE (such as the UE 116) is configured to perform frequency hopping for PUCCH transmissions, and is provided a frequency hopping interval and a starting PRB for PUCCH transmission for each of the frequency hops, the UE can also be provided with an offset to the starting PRB. Here the resource offset can be same or different for each of the starting PRB of the different frequency hops. For example, for PUCCH transmission over two frequency hops, the UE is provided startingPRB and secondHopPRB, and can be additionally provided can be configured a parameter offsetPRB that indicates a resource offset that is applied to startingPRB and secondHopPRB. It is also possible that the UE is provided multiple offset values that are applied to the startingPRB index and to the secondHopPRB index. It is possible that the UE is provided with more than two indices. For example, the UE can be provided four or eight resources for the start of PUCCH transmission in the corresponding four or eight frequency hops. A first PRB of a frequency hop can be indicated as an index relative to another PRB of another frequency hop (e.g., an index relative to the first PRB of the first frequency hop or relative to the first PRB of a subsequent frequency hop), or can be indicated as an absolute index that identifies a time and frequency resource for PUCCH transmission. The first PRB of each frequency hop can be indicated independently of the first PRB of any other frequency hop. Additionally or alternatively, a UE can be provided a frequency hopping interval corresponding to a frequency hop. The one or more resource offsets can be indicated by a DCI format or by MAC-CE, or can be configured by an RRC parameter. The one or more resource offset can be UE specific or can be cell-specific, or can be configured per UL BWP.

It is also possible that a resource offset for frequency hopping is associated to a transmission with DM-RS bundling enable, and may be applied for PUCCH transmission within a TDW for DM-RS bundling. Thus, the UE performs frequency hopping per interval of L slots and transmits the PUCCH starting from a first PRB, provided by startingPRB and offsetPRB, in slots of a frequency hopping interval and starting from the second PRB, provided by secondHopPRB and offsetPRB, in slots of a frequency hopping interval. The first slot of the first frequency hopping interval is the slot indicated to the UE for the first PUCCH transmission and has number 0 and each subsequent slot until the UE transmits the $$N_{PUCCH}^{repeat}$$

PUCCH in slots is counted regardless of whether or not the UE transmits the PUCCH in the slot. The slots in a frequency hopping interval are consecutive slots and the last slot of a frequency hopping interval and the first slot of a subsequent frequency hopping interval are consecutive slots.

In certain embodiments, a UE (such as the UE 116) is configured for frequency hopping for PUSCH repetition Type A. The UE can be configured for frequency hopping for PUSCH repetition Type A by the higher layer parameter frequencyHoppingDCI-0-2 in pusch-Config for PUSCH transmission scheduled by DCI format 0_2, or by frequencyHopping provided in pusch-Config for PUSCH transmission scheduled by a DCI format other than 0_2, or by frequencyHopping provided in configuredGrantConfig for configured PUSCH transmission. The UE can be configured for frequency hopping for PUSCH repetition Type B by the higher layer parameterfrequencyHoppingDCI-0-2 in pusch-Config for PUSCH transmission scheduled by DCI format 0_2, or by frequencyHoppingDCI-0-1 provided in pusch-Config for PUSCH transmission scheduled by DCI format 0_1, or by frequencyHoppingPUSCH-RepTypeB provided in rrc-ConfiguredUplinkGrant for Type 1 configured PUSCH transmission, the UE can also be provided with parameters for frequency hopping configuration that the UE uses when also configured with an operation of DMRS bundling.

Although FIG. 21 illustrates the method 2100, FIG. 22 illustrates the method 2200, FIG. 23 illustrates the diagram 2300, and FIG. 24 illustrates the diagram 2400 various changes may be made to FIG. 2124. For example, while the method 2100 and the method 2200 are shown as a series of steps, various steps could overlap, occur in parallel, occur in a different order, or occur multiple times. In another example, steps may be omitted or replaced by other steps. For example, steps of the method 2100 and the method 2200 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a communication system, the UE comprising:

a transceiver; and a processor operably coupled to the transceiver and configured to:

receive a first configuration to configure repetition transmissions of an uplink channel and a second configuration to enable demodulation reference signal (DM-RS) bundling of a DM-RS for the uplink channel;

determine a first time domain window, wherein:

in case that a third configuration to configure a number of consecutive slots for the first time domain window is received, the first time domain window is determined as the number of consecutive slots configured by the third configuration, and in case that the third configuration is not received, the first time domain window is determined based on a repetition number of the repetition transmissions of the uplink channel;

determine a second time domain window included in the first time domain window; and transmit the repetition transmissions of the uplink channel by maintaining power for the uplink channel and phase for the uplink channel in the second time domain window.

2. The UE of claim 1, wherein in case that a fourth configuration to configure inter-slot frequency hopping for the uplink channel is received, the second time domain window is determined based on a time domain interval of the inter-slot frequency hopping, and wherein the time domain interval of the inter-slot frequency hopping is configured as consecutive slots.

3. The UE of claim 1, wherein in case that a gap between two consecutive transmissions included in the repetition transmissions of the uplink channel exceeds a predefined size, an end time of the second time domain window corresponds to a start time of the gap.

4. The UE of claim 1, wherein the DM-RS bundling is applied to a DM-RS for the uplink channel in the second time domain window.

5. The UE of claim 1, wherein the repetition transmissions of the uplink channel are transmitted by maintaining a precoder for the uplink channel and a spatial domain filter for the uplink channel in the second time domain window.

6. The UE of claim 1, wherein the uplink channel is a physical uplink shared channel (PUSCH) or a physical uplink control channel (PUCCH).

7. A base station (BS) in a communication system, the base station comprising:

a transceiver; and a processor coupled with the transceiver and configured to:

transmit a first configuration to configure repetition transmissions of an uplink channel and a second configuration to enable demodulation reference signal DM-RS bundling of a DM-RS for the uplink channel; and receive the repetition transmissions of the uplink channel in a first time domain window included in a second time domain window after transmission of the first configuration and the second configuration, wherein in case that a third configuration to configure a number of consecutive slots for the second time domain window is transmitted, the second time domain window is the number of consecutive slots, wherein in case that the third configuration is not transmitted, the second time domain window is based on a repetition number of the repetition transmissions of the uplink channel, and wherein power for the uplink channel and phase for the uplink channel are maintained in the first time domain window.

8. The BS of claim 7, wherein in case that a fourth configuration to configure inter-slot frequency hopping for the uplink channel is transmitted, the first time domain window is based on a time domain interval of the inter-slot frequency hopping, and wherein the time domain interval of the inter-slot frequency hopping is configured as consecutive slots.

9. The BS of claim 7, wherein a precoder for the uplink channel and a spatial domain filter for the uplink channel are maintained in the first time domain window.

10. The BS of claim 7, wherein the uplink channel is a physical uplink shared channel (PUSCH) or a physical uplink control channel (PUCCH).

11. A method performed by a user equipment (UE) in a communication system, the method comprising:

receiving a first configuration to configure repetition transmissions of an uplink channel and a second configuration to enable demodulation reference signal DM-RS bundling of a DM-RS for the uplink channel;

determining a first time domain window, wherein:

in case that a third configuration to configure a number of consecutive slots for the first time domain window is received, the first time domain window is determined as the number of consecutive slots configured by the third configuration, and in case that the third configuration is not received, the first time domain window is determined based on a repetition number of the repetition transmissions of the uplink channel;

determining a second time domain window included in the first time domain window; and transmitting the repetition transmissions of the uplink channel by maintaining power for the uplink channel and phase for the uplink channel in the second time domain window.

12. The method of claim 11, wherein in case that a fourth configuration to configure inter-slot frequency hopping for the uplink channel is received, the second time domain window is determined based on a time domain interval of the inter-slot frequency hopping, and wherein the time domain interval of the inter-slot frequency hopping is configured as consecutive slots.

13. The method of claim 11, wherein in case that a gap between two consecutive transmissions included in the repetition transmissions of the uplink channel exceeds a predefined size, an end time of the second time domain window corresponds to a start time of the gap.

14. The method of claim 11, wherein the DM-RS bundling is applied to a DM-RS for the uplink channel in the second time domain window.

15. The method of claim 11, wherein the repetition transmissions of the uplink channel are transmitted by maintaining a precoder for the uplink channel and a spatial domain filter for the uplink channel in the second time domain window.

16. The method of claim 11, wherein the uplink channel is a physical uplink shared channel (PUSCH) or a physical uplink control channel (PUCCH).

* * * * *